(12) United States Patent
Chen et al.

(10) Patent No.: US 8,446,524 B2
(45) Date of Patent: May 21, 2013

(54) APPARATUS AND METHOD FOR FRAME RATE CONVERSION

(75) Inventors: Yung-Chin Chen, Saratoga, CA (US); Yun Gong, Cupertino, CA (US); I-Ming Pao, Palo Alto, CA (US)

(73) Assignee: Realtek Semiconductor Corp., Science Park, HsinChu (TW)

( * ) Notice: Subject to any disclaimer, the term of this patent is extended or adjusted under 35 U.S.C. 154(b) by 52 days.

(21) Appl. No.: 13/163,717

(22) Filed: Jun. 19, 2011

(65) Prior Publication Data

US 2011/0310295 A1 Dec. 22, 2011

Related U.S. Application Data

(60) Provisional application No. 61/356,670, filed on Jun. 21, 2010.

(51) Int. Cl.
*H04N 7/01* (2006.01)
*H04N 7/12* (2006.01)

(52) U.S. Cl.
USPC ...................... 348/441; 375/240.16

(58) Field of Classification Search
USPC .......... 348/441, 451, 452, 699–701, 458, 348/459; 375/240.16, 240.12, 240.24; 382/236, 382/300
See application file for complete search history.

(56) References Cited

U.S. PATENT DOCUMENTS

| | | | |
|---|---|---|---|
| 7,343,044 B2 * | 3/2008 | Baba et al. | 382/236 |
| 7,738,556 B2 * | 6/2010 | Nakamura et al. | 375/240.16 |
| 7,920,627 B2 * | 4/2011 | Hubrich et al. | 375/240.16 |
| 8,159,605 B2 * | 4/2012 | Sato et al. | 348/441 |
| 8,184,200 B1 * | 5/2012 | Biswas et al. | 348/459 |
| 8,233,730 B1 * | 7/2012 | Namboodiri et al. | 382/236 |
| 8,253,854 B2 * | 8/2012 | Pearlstein et al. | 348/441 |
| 8,265,158 B2 * | 9/2012 | Rossignol et al. | 375/240.16 |
| 2004/0252764 A1 * | 12/2004 | Hur et al. | 375/240.16 |
| 2007/0070250 A1 * | 3/2007 | Zhou et al. | 348/607 |
| 2010/0149422 A1 * | 6/2010 | Samuelsson et al. | 348/699 |
| 2010/0290530 A1 * | 11/2010 | Huang et al. | 375/240.16 |
| 2011/0206127 A1 * | 8/2011 | Nguyen et al. | 375/240.16 |

* cited by examiner

*Primary Examiner* — Paulos M Natnael
(74) *Attorney, Agent, or Firm* — Winston Hsu; Scott Margo

(57) ABSTRACT

The disclosure is regarding an apparatus and a method for frame rate conversion. The frame rate conversion apparatus, for receiving at least two input frames to generate at lease one output frame, comprises a motion estimation module for generating a candidate list comprising regional motion vectors and temporal motion vectors from the at least two input frames and choosing a winner motion vector from the candidate list, a motion compensation module for generating the at lease one output frame according to the winner motion vector, a frame feature extraction module for generating fade-in/out information or a logo detection information from the at least two input frames, and an adaptive MEMC control module for deciding a weighting of the winner motion vector according to the fade-in/out information or the logo detection information.

24 Claims, 28 Drawing Sheets

```
rdiffh1=window_ref[0][0]-window_ref[0][1];
rdiffh2=window_ref[1][0]-window_ref[1][1];
rdiffh3=window_ref[2][0]-window_ref[2][1];
rdiffh4=window_ref[0][1]-window_ref[0][2];
rdiffh5=window_ref[1][1]-window_ref[1][2];
rdiffh6=window_ref[2][1]-window_ref[2][2];
tdiffh1=window_tar[0][0]-window_tar[0][1];
tdiffh2=window_tar[1][0]-window_tar[1][1];
tdiffh3=window_tar[2][0]-window_tar[2][1];
tdiffh4=window_tar[0][1]-window_tar[0][2];
tdiffh5=window_tar[1][1]-window_tar[1][2];
tdiffh6=window_tar[2][1]-window_tar[2][2];
```

|   |   |   |
|---|---|---|
| [0][0] | [0][1] | [0][2] |
| [1][0] | [1][1] | [1][2] |
| [2][0] | [2][1] | [2][2] |

3x3 window

```
rdiffv1=window_ref[0][0]-window_ref[0][1];
rdiffv2=window_ref[0][1]-window_ref[1][1];
rdiffv3=window_ref[0][2]-window_ref[1][2];
rdiffv4=window_ref[1][0]-window_ref[2][0];
rdiffv5=window_ref[1][1]-window_ref[2][1];
rdiffv6=window_ref[1][2]-window_ref[2][2];
tdiffv1=window_tar[0][0]-window_tar[1][0];
tdiffv2=window_tar[0][1]-window_tar[1][1];
tdiffv3=window_tar[0][2]-window_tar[1][2];
tdiffv4=window_tar[1][0]-window_tar[2][0];
tdiffv5=window_tar[1][1]-window_tar[2][1];
tdiffv6=window_tar[1][2]-window_tar[2][2];
```

|   |   |   |
|---|---|---|
| 1 | 4 |   |
| 2 | 5 |   |
| 3 | 6 |   |

Vertical edge 1,2,3
Vertical edge 4,5,6

| MV_UR ACT_UR |
| MV_U ACT_U | MV_cur ACT_cur |
| | MV_L ACT_L |

APPARATUS AND METHOD FOR FRAME RATE CONVERSION

CROSS REFERENCE TO RELATED APPLICATIONS

This application claims the benefit of U.S. Provisional Application No. 61/356,670, filed on Jun. 21, 2010 and entitled "Apparatus and method for frame rate conversion", the contents of which are incorporated herein in their entirety.

BACKGROUND OF THE INVENTION

1. Field of the Invention

The invention relates to an apparatus and a method for frame interpolation, and more particularly to a apparatus and a method for motion estimation and motion compensation based frame rate conversion (FRC) in video signal processing.

2. Description of the Prior Art

The concept of motion compensated (MC) frame interpolation dates back to the late 1980s. MC-based interpolation has many advantages over other simple methods. In order to effectively interpolate new frames between original ones, the estimation of objects' motion in original frames of video input is often performed first, and then the estimated motion vectors are used for interpolation along the projected motion movement of objects in neighboring video frames. The terms "motion estimation and motion compensated" (MEMC) has thus frequently appeared in the literature to describe the technology in the many related applications. MEMC based FRC has gained much attention in recent years with advance of semiconductor and TV technology. A MEMC based FRC usually performs motion estimation by selecting a winner motion vectors from a set of candidate vectors. How to build the candidate set and how to pick the winner distinguish each MEMC method. The MEMC algorithm of prior art works well for scenes with consistent motions. For other difficult cases such as the boundaries of fast moving objects, occlusion scenes, and areas with little details, it results in lots of visible artifacts. Therefore, it poses both challenges and opportunities for us to develop better methods and systems for improving visual quality, for fully utilizing hardware capacity, and for balancing the cost and performance.

SUMMARY OF THE INVENTION

Therefore, one of the objectives of the present invention is to provide a frame rate conversion apparatus and a frame rate conversion method to improve visual quality.

The first aspect of our invention is to build the candidate list in different and more efficient ways by using novel ideas such as motion vector flow, regional motion vectors and small range search.

The second aspect of our invention is to carefully choose the winner candidate by using two different SADs, motion search results from two directions as well as different levels of biases.

The motion vectors found by motion estimation may not be correct due to aliases. The third aspect of the invention is to introduce a post-ME stage to compare the motion vectors with neighbors and make correction when inconsistency is detected.

The fourth aspect of the invention deals with the detection of occlusion scenes, i.e., covered/uncovered parts of video frames. Covered/uncovered objects can only be found in one of the two neighboring frames so motion estimation may fail to find any match. Thus the accurate detection of such objects is essential for correctly constructing interpolated frames based on motion compensation.

Logo in video is either still or has different motion than the rest of contents. It needs special handling to avoid annoying artifacts. The fifth aspect of the invention provides a reliable process to detect logo and perform proper motion compensation for logo area.

If true motions can be discovered in the ME stage, interpolation in the MC stage is simply a prediction of pixel values of moving objects along the motion trajectories. However, in reality, the true motion is often not easy to find. If wrong motion vectors are used, artifacts appear. The most important function of the MC stage is to identify those unreliable motion vectors, and find ways to make resulting artifacts as less visible as possible. We found motion vector consistency alone may not be enough for reliability check. Our sixth invention quantifies the reliability by using both SADs and motion vector info. The reliability would adaptively adjust how pixels are interpolated during the MC stage. We also detect occasions that we cannot use pixels from both frames for MC or artifact would appear since only one frame contains the correct pixels. A mechanism is proposed to detect these occasions and a single directional MC is proposed to use pixels from one frame but not the other. Sometimes the blockness artifact may appear when adjacent blocks do not use the same type of MC, i.e. one uses two frames and the other uses one frame. A special filter is proposed to blur the boundary and avoid the artifact caused by the single directional MC.

For frame level reliability, a unique set of statistic data in the ME stage are collected and calculated, and more than ten conditions are checked. We can then blend the original frames and interpolated frames using different weights based on frame level reliability and its time position so a perfect balance between judder and artifact can be achieved. In certain cases, we may simply want to turn off MEMC completely, such as scene change, fade-in/out, cross fade, and motion out of search range. This is the seventh aspect of our invention.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 shows adjacent horizontal and vertical pixel difference.

FIG. 16 shows neighbors used to find spatial bias.

DETAILED DESCRIPTION

The function of MEMC is to reduce the judder phenomenon resulted from low frame rate video (e.g. 24 f/s film) on high refresh rate video (e.g. 120 or 240 Hz for TV or monitors). Our MEMC can intelligently insert new interpolated frames at proper time instant between original frames.

Figure 1:
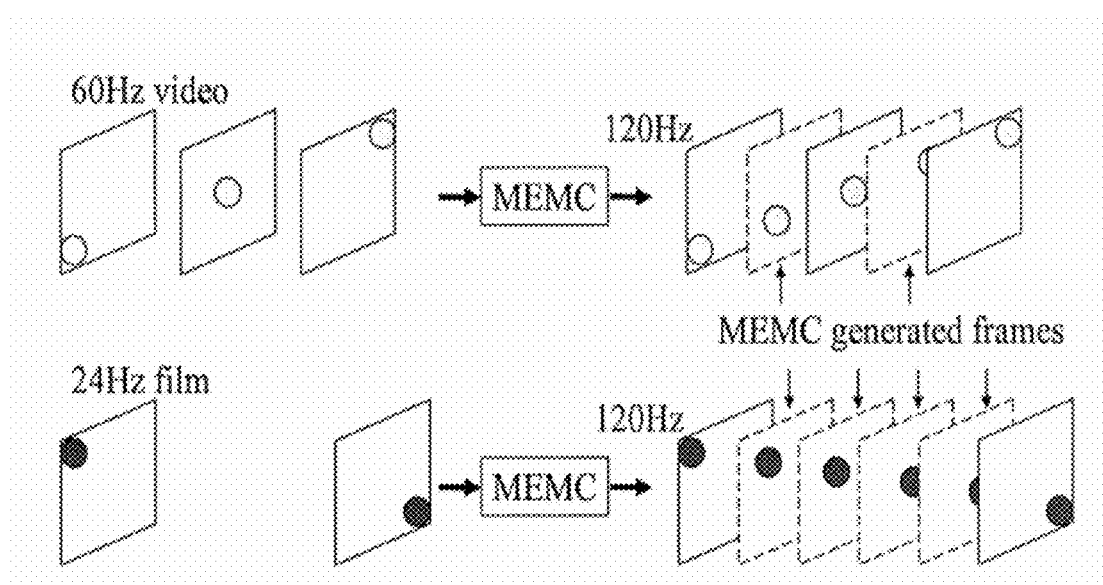
FIG. 1 illustrates MEMC.

FIG. 1 shows the effects of applying MEMC on 60 Hz video and 24 Hz film to generate 120 Hz pictures, i.e., frame rate conversion from 60 Hz and 24Hz to 120 Hz. As shown in FIG. 1, the resulting 120 Hz pictures give smoother motion and judder is reduced.

Figure 2:
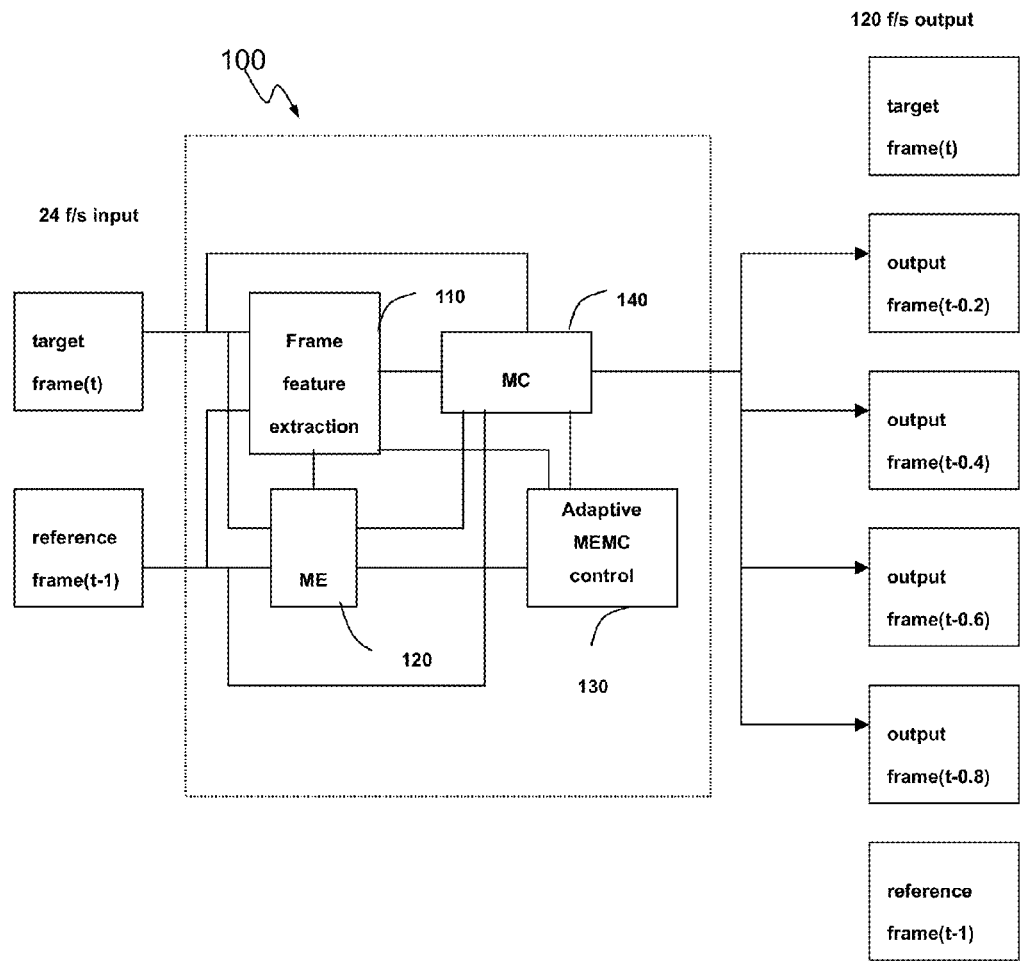
FIG. 2 shows a frame rate conversion apparatus according to one embodiment of the invention.

FIG. 2 gives an example of 24 f/s input and 120 f/s output after the MEMC process. Target and reference frames are two adjacent frames in the original 24 f/s sequences. Note: current embodiment uses two frames, but multiple frames, i.e., more than two frames, can be used.

Refer to FIG. 2, according to one embodiment of the invention, frame rate conversion apparatus 100 comprises motion estimation (ME) module 120 and motion compensation (MC) module 140. Motion estimation module 120 is for generating a candidate list comprising regional motion vectors and temporal motion vectors from at least two input frames comprising target and reference frames, and choosing a winner motion vector or winner candidate from the candidate list. Motion compensation module 140 is for generating at least one output frame according to the winner motion vector and input frames.

According to another embodiment, the regional motion vectors are local regional motion vectors and the temporal motion vectors are MvFlow candidates.

According to another embodiment, frame rate conversion apparatus 100 further comprises frame feature extraction module 110 and adaptive MEMC control module 130. Frame feature extraction module 110 is for extracting information from input frames. Adaptive MEMC control module 130 is for deciding a weighting of the winner motion vector according to the information from frame feature extraction module 110 or motion estimation module 120. According to another embodiment, frame feature extraction module 110 is for generating fade-in/out information from the input frames, adaptive MEMC control module 130 is for deciding a weighting of the winner motion vector according to the fade-in/out information, and the output frame is generated according to the weighting. According to another embodiment, frame feature extraction module 110 is for generating logo detection information from the input frames, and the output frame is generated according to the logo detection information.

Motion estimation (ME) module 120 generates the trajectory of the objects in the input frames and presents it by motion vector (MV). The generated (interpolated) frames are created based on the motion vectors and put the objects at the proper locations based on the time when the generated frames are displayed.

Motion compensation module 140 uses the MV and the target and reference frames to create the interpolated frames between target and reference frames.

Adaptive MEMC control module 130 uses the statistical information collected from ME module 120 and information from frame feature extraction module 110 to decide the weighting of the target and reference frame, the object locations, and a weighting of winner MV on the output frames. In some situations, e.g., scene change, adaptive MEMC control module 130 also provides feedbacks to ME module 120 to adjust the ME behavior.

Figure 3:
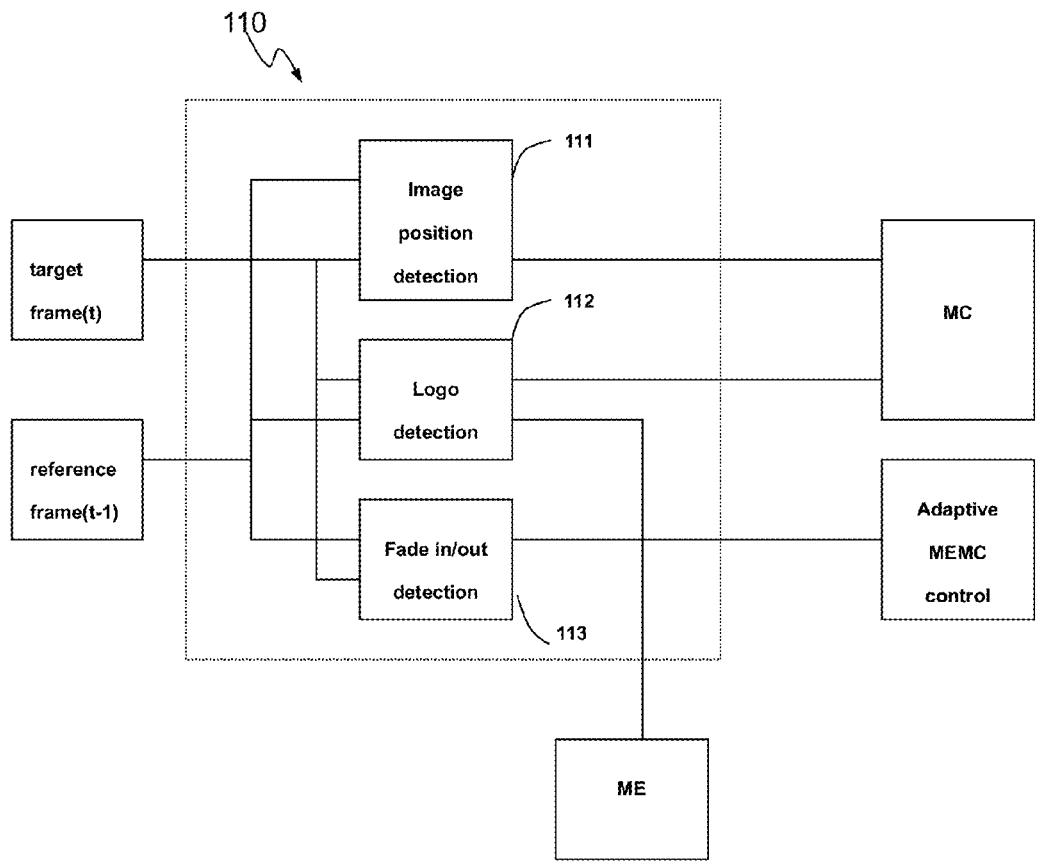
FIG. 3 illustrates a frame feature extraction module according to one embodiment of the invention.

Refer to FIG. 3, frame feature extraction module 110 may comprises image position detection unit 111, logo detection unit 112, or fade-in/out detection unit 113. Frame feature extraction module 110 analyzes the picture contents from input frames and provides information such as active picture content location using image position detection unit 111, logo locations or logo detection information using logo detection unit 112, and fade-in/out information using fade-in/out detection unit 113. Frame feature extraction module 110 analyzes the original frames and extracts the useful features for ME module 120 and MC module 140, e.g., active contents in the pictures, logo locations, and fade-in/out detection. This information then feeds to ME module 120 to help on getting better MVs. It is also used in MC module 140 to make sure the correctness of interpolated pixels in the output frames. Other information, like fade-in/out detection information is sent to adaptive MEMC control module 140 to control the output frame results, e.g., to decide a weighting of the winner motion vector according to the fade-in/out information.

Figure 4:
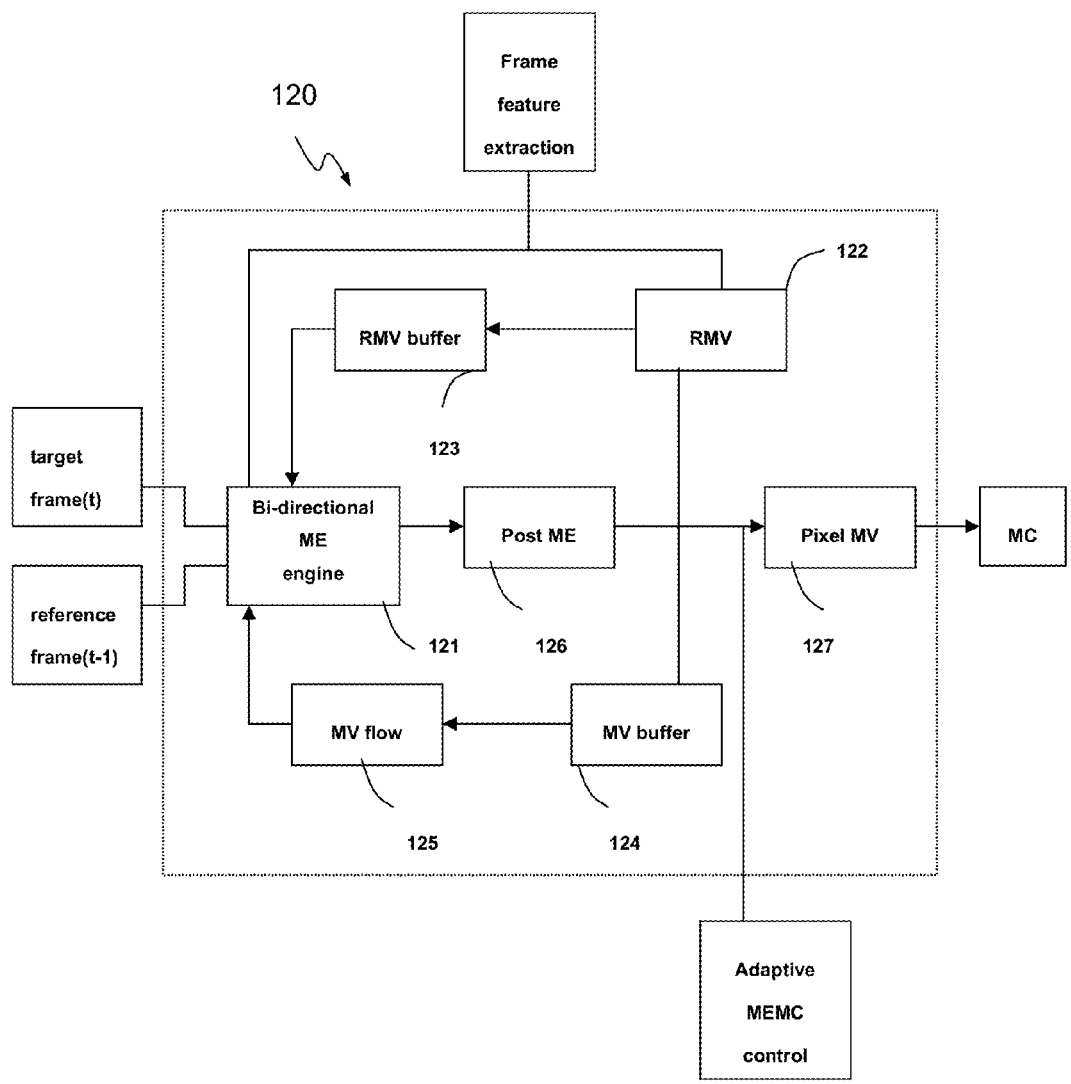
FIG. 4 shows an ME module according to one embodiment of the invention.

FIG. 4 shows the block diagram of motion estimation module 120, which comprises Bi-directional ME engine 121, RMV detection unit 122, RMV buffer 123, MV buffer 124, MV flow unit 125, Post ME unit 126, and Pixel MV unit 127. Bi-directional ME engine 121 is to search a winner MV (winner candidate) from target frame to reference frame and/or from reference frame to target frame. RMV detection unit 122 is for detecting and generating regional motion vectors (RMV) and RMV buffer 123 is for storing the RMVs and providing RMV candidates to Bi-directional ME engine 121. MV buffer 124 is for storing MVs from RMV detection unit 122 and winner MVs after Post ME process as temporal motion vectors, wherein the MVs comprises previous ones. MV flow unit 125 is for detecting MV flow candidates from temporal motion vectors according MV flow detection and outputting them to Bi-directional ME engine 121. Post ME unit 126 is for performing a post ME process to correct the winner motion vector and outputting winner MVs after Post ME process to RMV detection unit 122, MV buffer 124, and Pixel MV unit 127, wherein the post ME process comprises at least one of MV jump correction, cover detection, and outlier filtering. And Pixel MV unit 127 is for deriving MV for each pixel.

The target frame is partitioned into small fixed size blocks. Then the reference frame may be searched for the best match, and motion vectors (MV) are assigned to represent the trajectory of the block moving from the target frame to the reference frame. Currently Sum of Absolute Difference (SAD) is used as the criterion to determine the winner MV. But our invention is not limited by using SAD as the search criteria.

Since ME is a computational intensive task, to avoid search the entire reference frame, fast search may be used and only a few points are searched. After the winner motion vector for each block is found, a post ME process will be performed to correct erroneous motion vectors and mark the area where the occlusion occurs. Then a motion vector is derived for each pixel, and MC is performed to generate the output pixel.

The motion estimation (ME) is the process to find a motion vector (MV) to represent the movement of an object between adjacent frames. We partition an entire picture into fixed size blocks, such as 8×8 or 16×16. We then search for a best match between two frames based on a search criterion. Some commonly used criteria includes SAD (sum of absolute differences), MSE (mean square error), or MAD (mean absolute distortion). We assume SAD is used here but the invention is not limited by the search criteria we choose. Fixed target search may be used: We fix a block in the target frame and the search is performed on the reference frame. The most detailed search method is the full search. A full search means to search every possible location in the search range. This may be impractical when the picture size is large and the search range is large. Instead of full search, fast search method is usually used and it only searches a subset of all possible candidates. The selection of the subset, i.e. candidates, is very important and it would affect the performance of ME. Usually the motion of the current block is closely correlated to its neighborhood blocks. They are good candidates to explore for fast search. Zero motion vector is also a common used candidate. If hierarchical motion estimation (HME) is used, its winners can be candidates too.

In our invention, we propose two special types of candidates. The first one is MvFlow candidates. By keeping track how the object moves we can use the trajectory from time t−2 to time t−1 and the like to project where the object will be located in time t. The second one is Regional Motion Vector (RMV). When the scene is panning, the whole picture is moving in a uniform direction, this motion vector, we called it Global Regional Motion Vector (GRMV), can be a good candidate. If the picture does not pan, we may still be able to find a motion vector to represent a local uniform movement. We called it Local Regional Motion Vector (LRMV).

Sometimes the motion of the current block may be a little different from its candidates. Therefore, we can improve the performance by searching the vicinity or neighborhood of the candidate to get more accurate motion of the block. We can call it small range search.

Bi-directional search scheme is used to help the scenario that only search from one direction can be found but not the other direction. This includes picture boundary and cover/uncover cases. Forward search is search from target frame to the reference frame. And backward search is from reference frame to target frame.

After each candidate is searched, we found to use the search criteria alone, such as minimal SAD, may not be able to find the true motion of the block. It may find an alias instead. To minimize the mistakes, we add bias to the search criteria before comparison. The bias is different for each candidate and is based on the characteristics of each candidate and correlation with its neighborhood.

Finally, a post ME process is invoked to correct some of the erroneous winner motion vectors.

If an object travels across the frames in a uniform speed, its motion vector should be almost constant and its new location can be predicted easily from the previous movement. Such motion vector would be a good candidate to search. We introduce a method, called Mvflow, to find such candidates.

Figure 12:
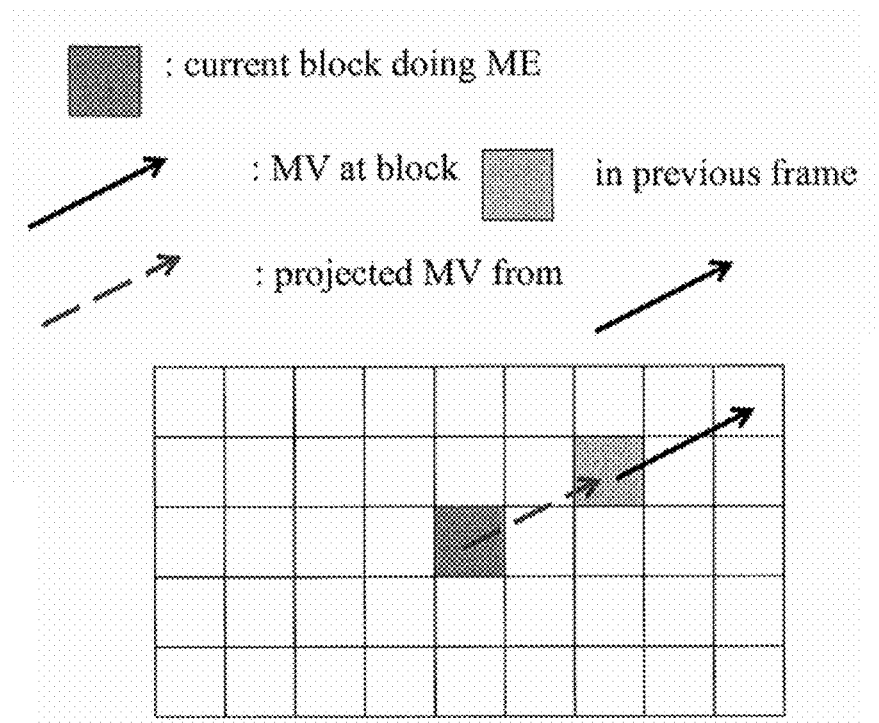
FIG. 12 shows MvFlow candidate illustration.

Refer to FIG. 12, the light gray block in previous frame has a MV of solid line. Assuming constant motion, the light gray block will move to the dark gray block location. So for ME in dark gray block, we can use the dashed MV as the candidate, and we call it MvFlow candidate.

Figure 13:
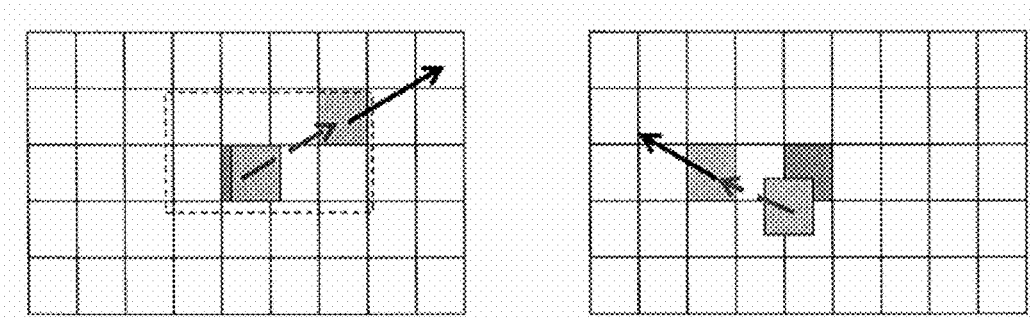
FIG. 13 shows MvFlow candidate examples.

As shown in FIG. 13, a block may have more than one MvFlow candidate, and there is a possibility that there is no MvFlow candidate for a block.

Figure 14A:
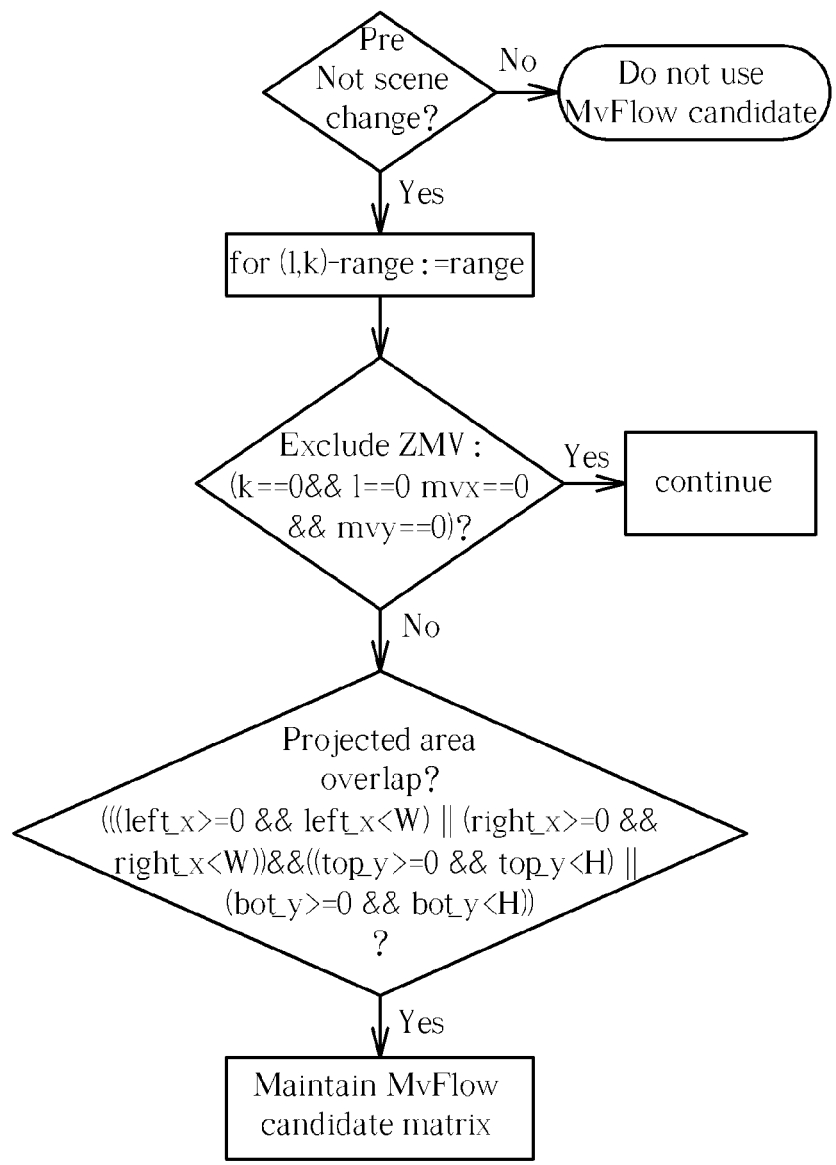
FIG. 14 shows an MV flow flowchart according to one embodiment of the invention.
Figure 14B:
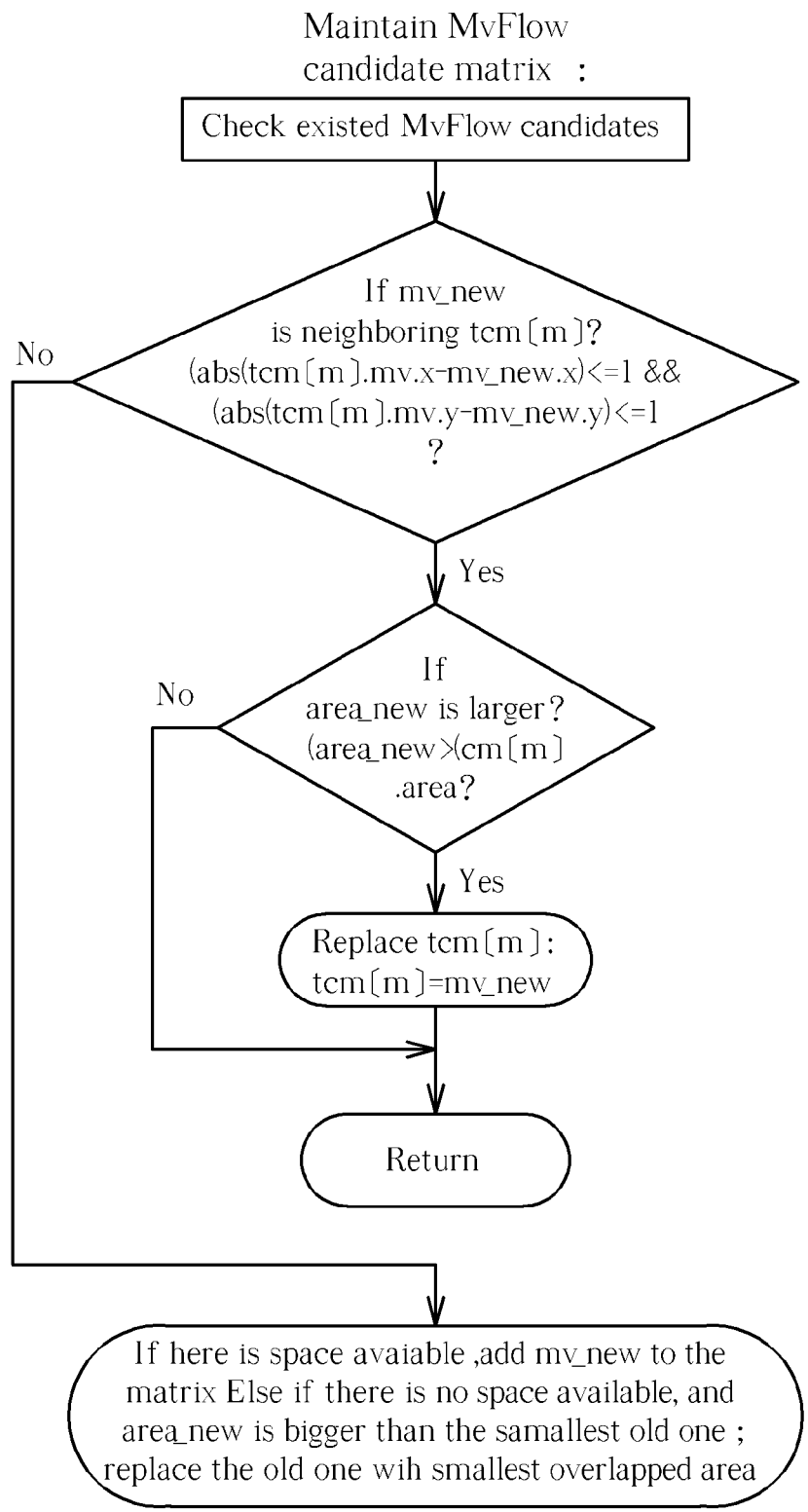

The blocks in the previous frame that are considered for MvFlow should not be farther than the maximal search range. Since there could be a lot of MvFlow candidates, we add some constraints to remove candidates that have less chance to be the true motion. As shown in the flowchart of FIG. 14, we can shrink the current block size and/or the candidate block size during the overlap calculation. And we exclude candidates with small overlapped area. Therefore, if the projected movement does not provide enough overlap, position-wise or area-wise, we can exclude such candidates. There could be still a lot of candidates that we are unable to search them all. We can sort them in the order of likeness based on criteria such as overlapped area size or motion vector sizes, and pick the top ones as MvFlow candidates. When the motion vectors of two candidates are close to each other, we will perform a merge to reduce redundant search so we can allow more unique candidates as shown in FIG. 14.

Figure 15:
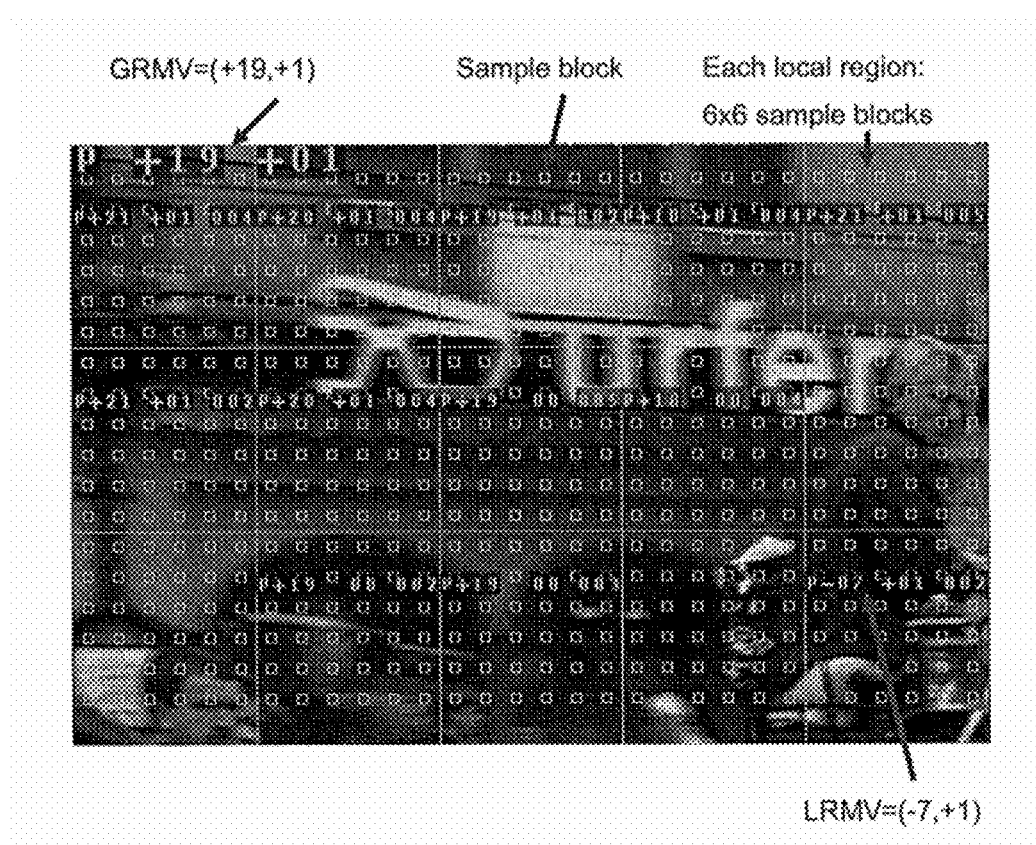
FIG. 15 illustrates GRMV and LRMV.

In global panning scene, we can use one motion vector to represent the motion for the entire picture. This MV is called Global Regional Motion Vector (GRMV). The same phenomenon can be observed on a smaller region. We can use a motion vector to represent its movement called Local Regional Motion Vector (LRMV). For example, LRMV can represent a motion vector for each 6×6 blocks as shown in FIG. 15. 6×6 block is only a example shown here, and should not limit to it. LRMVs can be a motion vectors to represent the motions of true objects in the video with arbitrary shapes and change over time. Since we cannot calculate GRMV or LRMV for the current frame before the search is done, we use GRMV and LRMVs from the previous frame for candidates. Both are proven to be good candidates to use in the fast search.

We also add a negative bias to the GRMV and LRMV candidates to favor such candidates. The bias is not a constant. It depends on the reliability of the GRMV and LRMV and the activity of the block. The reliability of GRMV and LRMV is measured by the variance of the motion vectors from the GRMV/LRMV region. If the variance is small, the reliability is high.

For each candidate, we will perform a small range search centered at each candidate. A range can be defined as, say, x:−3 . . . +3 & y:−3 . . . +3, and all positions in that range are searched. We may or may not use fractional pixel search (half-pixel or quarter-pixel), and the best match location will represent this candidate as the winner and will be compared with other candidates in the final decision stage.

While small range search around each candidate helps to capture fast motion more efficiently, it sometimes results in small variation of motion vectors even for blocks belonging to the same object. The small MV variation may not be a problem for most scenes, but it may cause some artifacts. In addition, the search criteria may not be accurate. We may find some other unrelated blocks that match the current block better than its true motion. The phenomenon is called ME aliases. This occurs often on an area with similar texture or a repeated pattern. The wrong motion vector would cause artifact.

To avoid this kind of small variation in the MVs, we would favor the MV which is closer to the original candidate location. For example, we can calculate a bias based on the distance from the original position when performing small range search, and add the bias to SAD.

Among all the candidates, the one with the best search criteria such as smallest SAD is usually chosen as the winner motion vector or winner candidate. However, such motion vector may not represent the true motion of the current block due to the complexity of video and the limitation of the block based motion search. It would cause artifact if incorrect motion vector is chosen.

We conquer this issue by adding biases to SAD before comparison. To consider spatial correlation between the current block and its neighbors, and temporal correlation between the current block and its counterpart in the previous frame, we calculate spatial bias (sbias) and temporal bias (tbias), and add them to SAD. The ME winner will be the one with the smallest total SAD (SAD+spatial bias+temporal bias). If there are two candidates with similar SADs, the one with stronger spatial and/or temporal correlation (i.e. smaller spatial+temporal bias) would likely win. This can reduce the occurrence of ME aliases.

We found the bias is also related to the complexity of the block. The more complicated the block texture is, the higher SAD it is likely. Thus bias value also needs to be higher to become effective. There are many ways to estimate the complexity of a block. We estimate the complexity of the block by calculating the activity of the block as shown below, where (start.x, start.y) and (end.x, end.y) are used to represent the starting and ending positions of the block, and block[y][x] is the pixel value of position (x,y).

```
activity = 1;
for(y=start.y; y<end.y; y+=4){
    for(x=start.x; x<end.x; x+=4){
        activity +=
            abs(block[y ][x+1] – block[y ][x+3]) +
            abs(block[y+1][x ] – block[y+1][x+2]) +
            abs(block[y+2][x+1] – block[y+2][x+3]) +
            abs(block[y+3][x ] – block[y+3][x+2]) +
            abs(block[y ][x ] – block[y+2][x ]) +
            abs(block[y+1][x+1] – block[y+3][x+1]) +
            abs(block[y ][x+2] – block[y+2][x+2]) +
            abs(block[y+1][x+3] – block[y+3][x+3]) ;
    }
}
```

Figure 16:
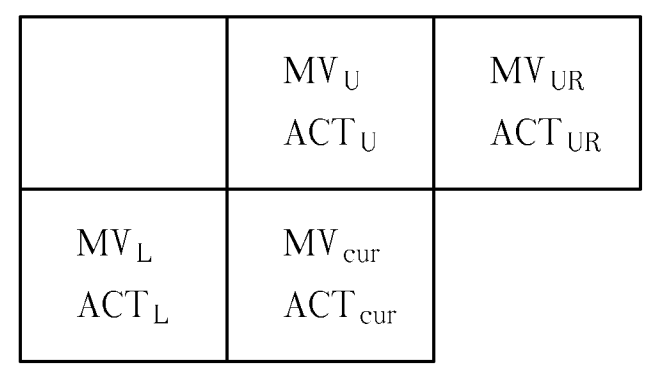

For the current block, we consider its three neighborhood motion vectors: left, upper and upper-right blocks as shown in FIG. 16 (other neighbors can also be used). The motion vectors of the neighboring blocks that have similar activities to the current block will be used to calculate the average motion vector difference.

```
count = mv_dif = 0;
if (|ACT_L − ACT_{cur}|< thr){
    count++; mv_dif += (|MV_L.x − MV_{cur}.x| + |MV_L.y− MV_{cur}.y|)
}
if (|ACT_U − ACT_{cur}|< thr){
    count++; mv_dif += (|MV_U.x − MV_{cur}.x| + |MV_U.y− MV_{cur}.y|)
}
```

-continued

Figure 17:
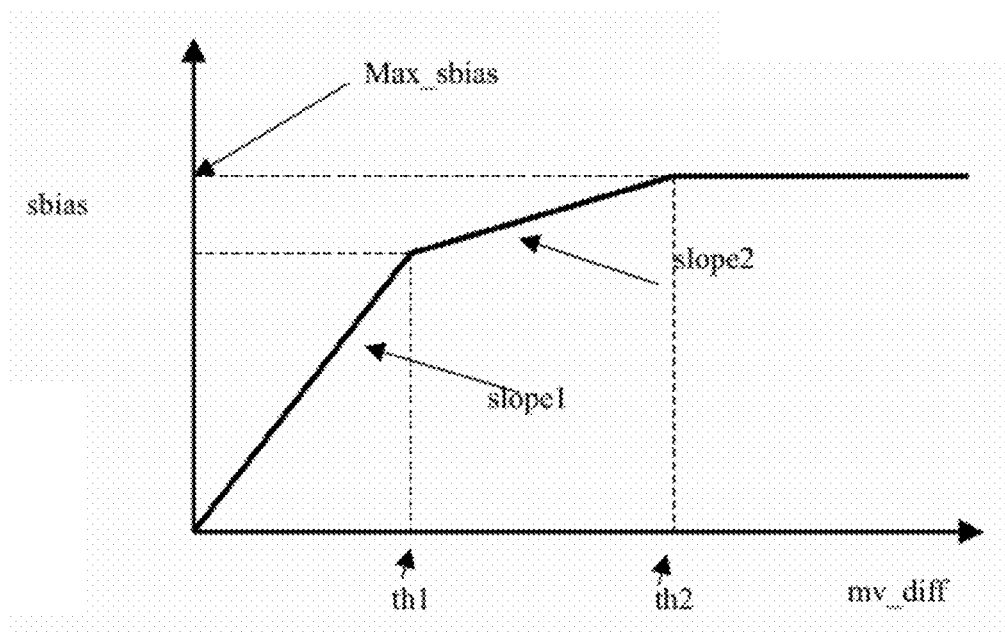
FIG. 17 shows an example of sbias lookup.

```
if (|ACT_{UR} − ACT_{cur}|< thr){
    count++; mv_dif += (|MV_{UR}.x − MV_{cur}.x| + |MV_{UR}.y− MV_{cur}.y|)
}
if (count!=0)
    mv_dif = mv_dif/count;
```

Where ACT represents the activity of each block considered, thr is a threshold used to define similarity of two activities, and MV.x and MV.y are the motion vector values in horizontal and vertical directions. The sum of absolute values |MV.x|+|MV.y| is used for defining the motion vector distance. The average motion vector difference mv_dif is then used to look up a sbias. One example is given in FIG. 17. In general, when the difference is small, the bias is smaller, which makes this block easier to become the winner. When the difference is large, the bias is larger which make this candidate less preferred. The bias value is also affected by the activity of the current block. If the activity is higher, the bias tends to be higher since the SAD of such block tends to be higher.

Figure 18:
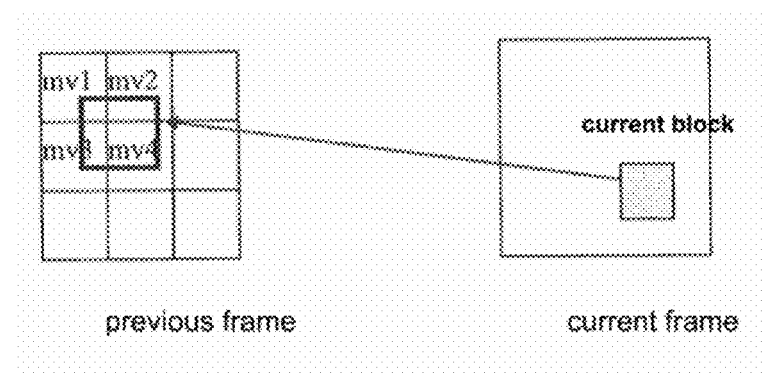
FIG. 18 illustrates temporal bias.

To calculate tbias, for the current block in the current frame in FIG. 18, we can imagine that it comes from a blue block in the previous frame. The blue block may not align with the block grids in the previous frame. Therefore, we calculate $MV_{avg}$ by bilinear interpolation as follows.

$$MV_{avg}=(mv1*s1+mv2*s2+mv3*s3+mv4*s4)/(s1+s2+s3+s4),$$

where mv1, mv2, mv3 and mv4 are used to represent both four blocks in the previous and their respective motion vectors, s1, s2, s3, and s4 are the blue block's overlapped areas with mv1, mv2, mv3 and mv4.

MV difference mv_dif between the current block and MVavg is calculated as $$mv\_dif=|MV_{avg}.x-MV_{cur}.x|+|MV_{avg}.y-MV_{cur}.y|,$$

Figure 19:
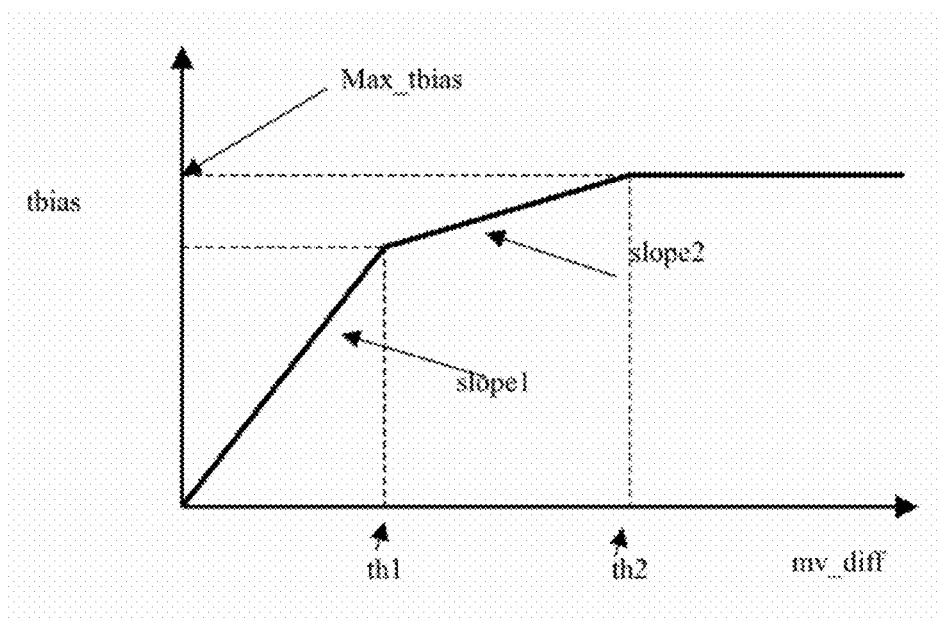
FIG. 19 shows an example of tbias.

We then use the mv_dif to look up a bias value, tbias. One example is given in FIG. 19. A smaller tbias is given if the difference is small, otherwise, a bigger tbias will be given.

In previous sections, we show the motion estimation using two frames, frame time t as the target and frame time t−1 as the reference. More accurate ME results can be achieved by using more frames for ME. For example, using three or more frames, and if the object can be successfully tracked from first frame to second frame and then to third frame, then the confident level for that motion can be higher than using two frame search.

Figure 20:
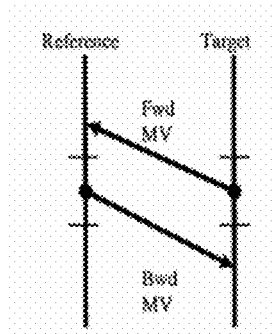
FIG. 20 shows illustration of forward and backward search.

Another example to increase accuracy is using forward and backward search, i.e., bi-directional search scheme. Let's say the search from frame at time t to frame at time t−1 is the forward search, then we can do the backward search, which will search from frame time t−1 to frame time t. This is illustrated in FIG. 20. Both use identical candidate list. And the results from both searches will be compared to determine the final winner.

There are two cases that would benefit from bi-directional search. If some blocks cannot find good match in forward search because the area is covered or occluded in the reference frame, using backward search where the area may be uncovered or revealed would find the true motion. Our cover and uncover detection is based on bi-directional search scheme.

Figure 21:
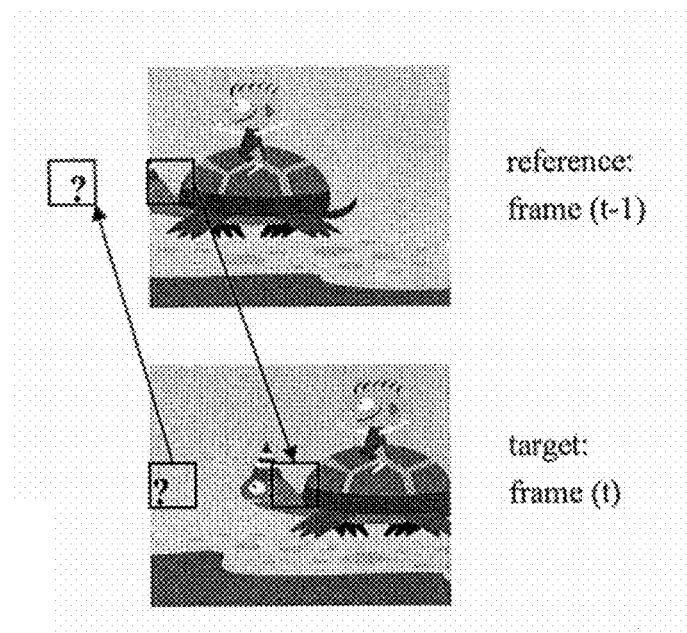
FIG. 21 shows bi-directional search during panning video.

Another case is the picture boundary of a panning video as show in FIG. 21. The forward search cannot find any match in the reference frame because that part has not moved into the frame yet. But the backward search from the same location can find the correct motion vector easily. The winner would be backward search and motion compensation can interpolate the block properly.

After each block has its winner MV, a post ME process is performed to remove or correct erroneous winner motion vectors. The post ME process comprises at least one of MV jump correction, Cover/uncover detection, and MV outlier filtering.

1. MV jump correction to reduce double image artifact.
2. Cover/uncover detection, which detects the area where cover (occlusion) and uncover (reveal) occurs.
3. MV outlier filter: since the block and its neighbors should be moving along if they belong to the same object, so if current block's MV is very different from its neighbors (e.g. in a 3×3 neighborhood), a MV correction is performed (e.g. using median of its neighbors to replace the current one). Another example is forward/backward winner. If the block is using forward MV as the winner but most of its neighbors are using backward MVs, then it may be better to use backward MV on this block too, and vice versa.

More details about reduction of double image artifact and cover/uncover detection are described below.

Figure 22:
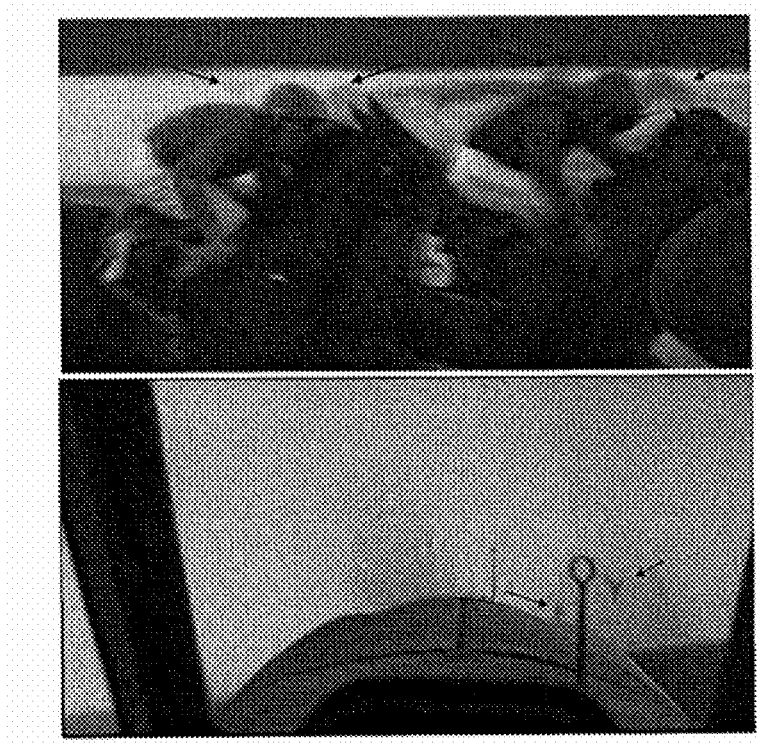
FIG. 22 shows double image artifact examples.
Figure 23:
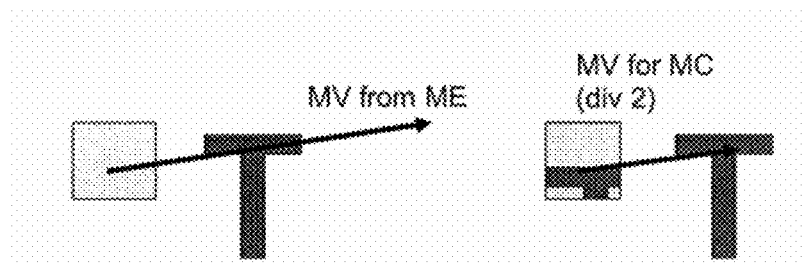
FIG. 23 illustrates artifact explanation.

This MV jump detection is applied to reduce the artifact frequently seen in front or behind an object when the object is not moving together with the background as shown in FIG. 22. One scenario for the artifact is illustrated in FIG. 23. While doing motion estimation, the block's MV is pointed over the Letter T. For MC, the MV will be halved to retrieve the motion compensated component, and as shown from the FIG. 23, it is from the Letter T. Then the artifact is observed. The reason for having the MV over Letter T may result from using GRMV for the background, where Letter T is still (not moving with the background).

Figure 24:
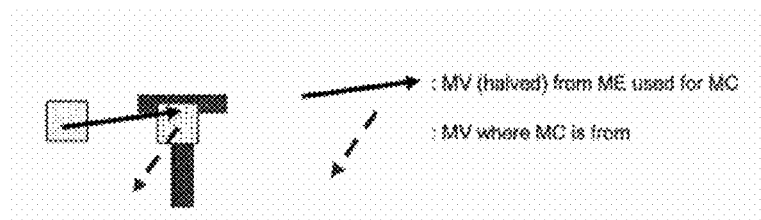
FIG. 24 shows comparison of the MV differences.

To reduce the artifact, as shown in FIG. 24, for the block under test, its MV (shown as solid MV in the figure, after halved from original length) is pointed to the dotted block. We then compare the MV for that dotted block (shown as dashed MV in the figure) with the solid MV. If they differ a lot, we assume the MC using this MV is not reliable. We will change the MV to its replacement. The dotted block may not sit on the block grids. So the dashed MV is actually the average of the MVs from the blocks where the solid MV is pointed.

Another type of artifact also occurs often in front of or behind an object when the object is not moving together with the background and the background is a complicated scene. The background where the object moves in will be covered (occluded), and the background where the object moves out will be uncovered (revealed). For the cover area, the pixel information is available in frame (t−1) but not in frame (t). For the uncover area, the pixel information is available in frame (t) but not in frame (t−1). Since ME compares the difference between two frames' pixels, there will be a problem if the pixel information is missing in one of the frames. And the resulting MV is not indicating the true motion.

The above problem can be avoided when multiple-frame ME is used. While we cannot find in frame (t) or frame (t−1), we may be able to find in frame (t−2) or frame (t+1). What is not found by forward ME may be found by backward ME, and vice versa. By using forward/backward ME, cover/uncover area can be detected easily, and proper compensation scheme is applied on the blocks marked as cover/uncover area to reduce artifact.

Figure 25:
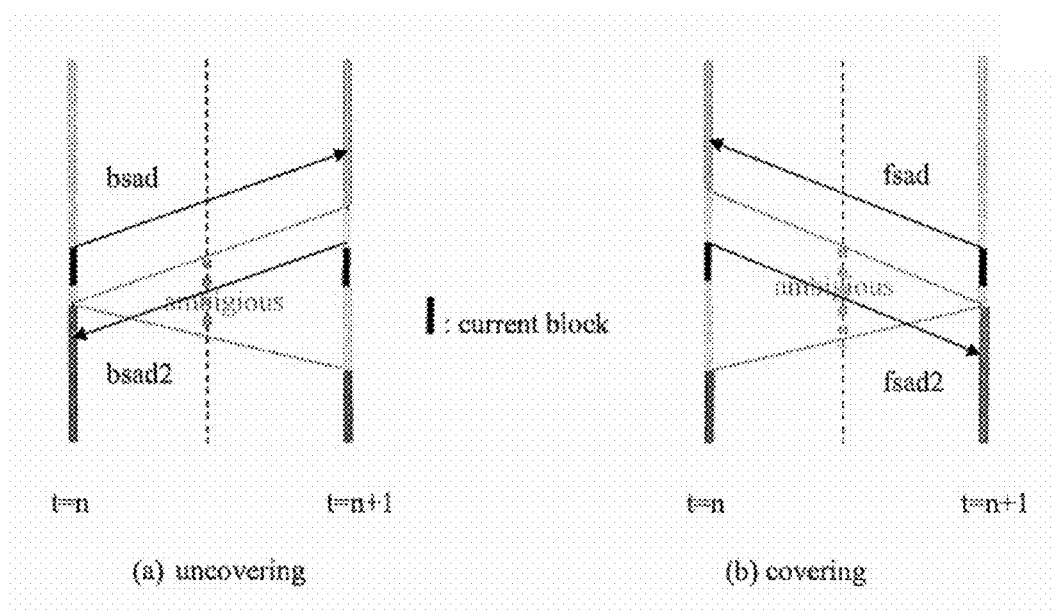
FIG. 25 shows bi-directional search for covering and uncovering.

According to one embodiment of the invention, cover/uncover detection is done by comparing SAD information in forward and backward directions for forward and backward winners.

bsad=SAD of backward search using backward search winner;
bsad2=SAD of forward search using backward search winner;
fsad=SAD of forward search using forward search winner;
fsad2=SAD of backward search using forward search winner;

If bsad is small and bsad2 is big, there is a possibility that the block is a UNCOVER block as shown in FIG. 25 (a). If fsad is small and fsad2 is big, there is a possibility that the block is a COVER block as shown in FIG. 25 (b). Otherwise, it is a NORMAL block, where fsad, fsad2, bsad and bsad2 would be close to each other.

As for the logo detection, we assume the COVER and UNCOVER blocks should stay in groups, so the post ME process would remove isolated COVER and UNCOVER blocks.

Figure 5:
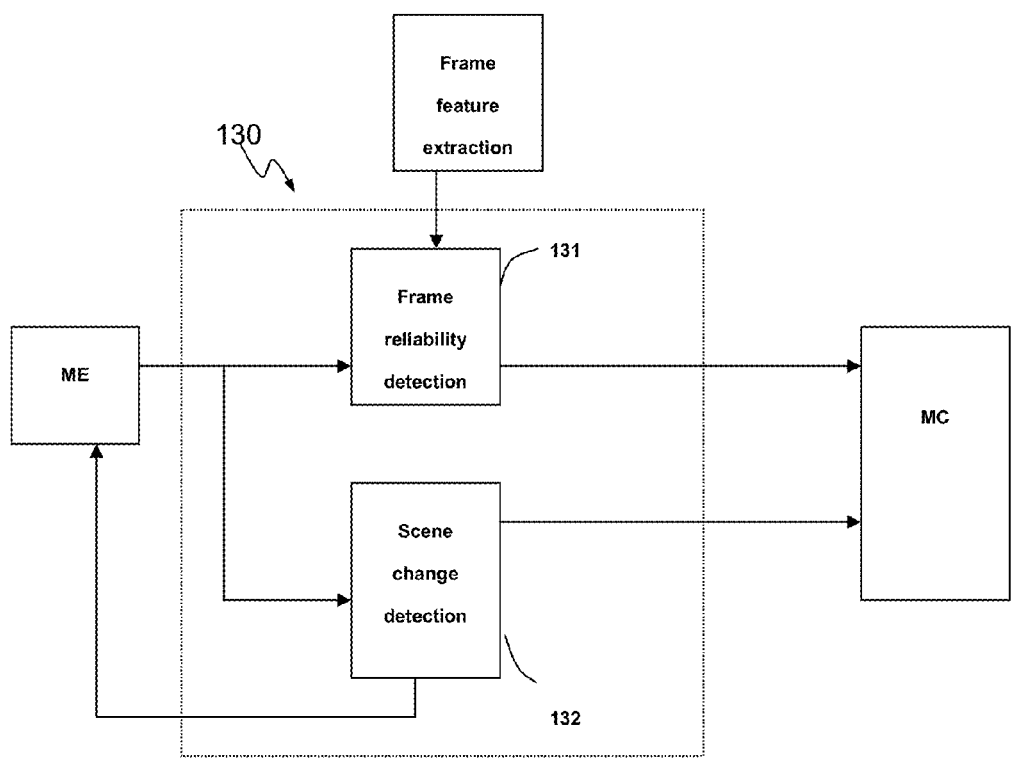
FIG. 5 shows an adaptive MEMC control block module according to one embodiment of the invention.

FIG. 5 shows the diagram of the adaptive MEMC control module 130, which comprises frame reliability detection unit 131 and scene change detection unit 132. Frame reliability detection unit 131 decides how strong MEMC FRC should be perform, i.e. the value of MC_off level or the weighting of the winner motion vector, and outputs frame reliability detection information and the weighting to MC module 140. Information from ME such as SAD, MV, and MV differences and information from frame feature extraction module 110 such as fade-in/out information are used. If the frame reliability is high, we will turn MEMC in full frame rate and output the complete interpolated frames. If the frame reliability is lower, we can either reduce MEMC frame conversion rate or blend the original frames with interpolated frames. The video will have more judder and less artifact. If the frame reliability is really low, we turn off MEMC completely to avoid any artifact. However, it can have serious judder.

Scene change detection unit 132 performs scene change detection based on SAD and MV information from ME module 120 and outputs scene change detection information to ME module 120 and MC module 140. When SADs are large and MVs are not consistent, it means we cannot find a good match between the current frame and the previous frame. A scene change likely has occurred. The information is sent to ME module 120 to control candidate selection and sent to MC module 140 to control output frame generation.

Figure 6:
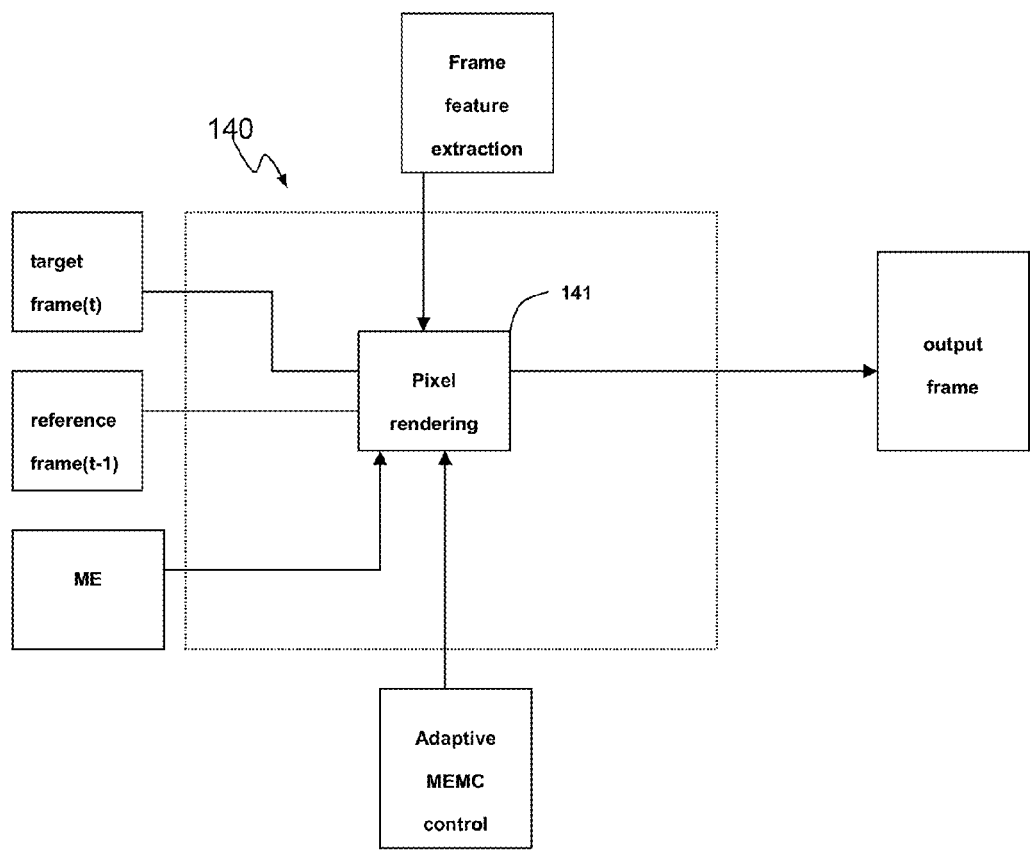
FIG. 6 shows an MC block module according to one embodiment of the invention.

FIG. 6 shows the diagram of the motion compensation module 140, which comprises a pixel rendering unit 141. Winner MV from ME is used to retrieve the pixels from the original frames to rendering the interpolated pixels in output frame. Active video boundary and logo information from frame feature extraction module 110 are used to handle special cases for MC. MC_off information from adaptive MEMC control module is used to adjust weighting for winner MV and pixels.

Figure 26:
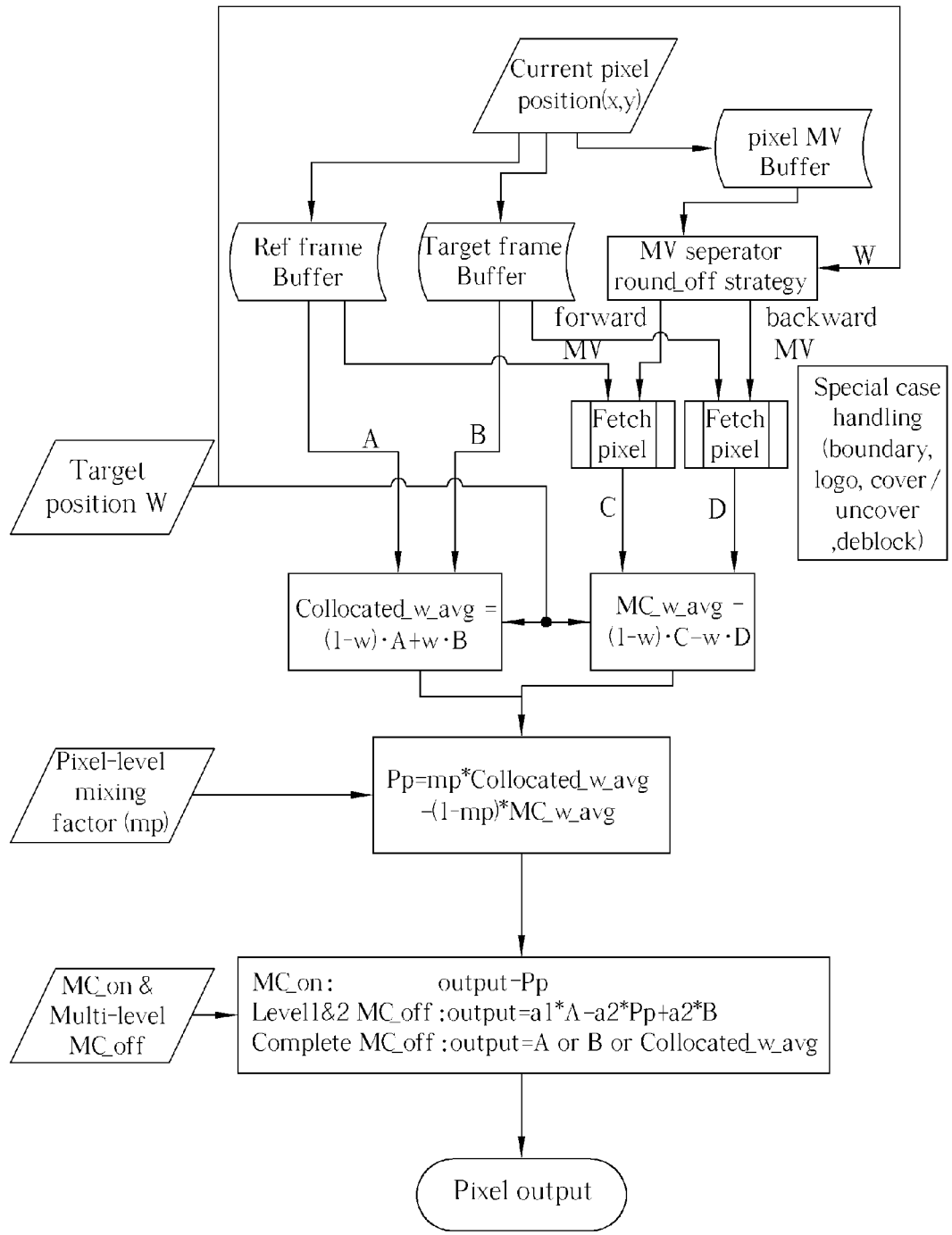
FIG. 26 shows an MC flowchart.

The function of MC module 140 is to generate the interpolated output frames between the original frames. It takes the winner motion vectors from ME module 120 and pixels from the original pictures as input, along with block SAD, cover/uncover, logo and scene change information for adaptively controlling the interpolated pixel values. FIG. 26 shows our MC flow.

Figure 27:
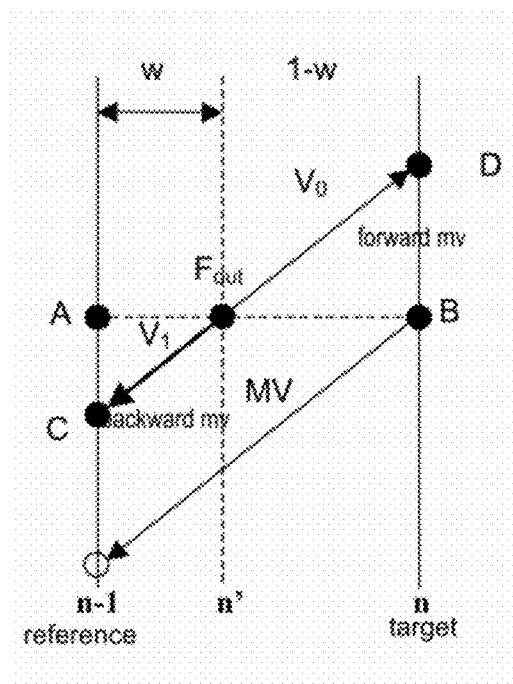
FIG. 27 shows pixel fetching from previous (reference) and current (target) frame.

FIG. 27 illustrates how pixels from the previous (reference) and current (target) frames are fetched for MC. The yellow point is the output pixel $F_{out}$ (to be generated) on the interpolated output frame, the red points C, D are the pixels on the original frames pointed by MV, and the blue points A, B are the pixels on the original frames at collocated positions. And the weight w ($0 \leq w \leq 1$) denotes the time position of interpolated frame. Based on block level MVs we will assign a MV for each pixel. There are many different ways to derive pixel level MV from block level MVs. Suppose the MV for each pixel is already available. For simplicity, the MV of current pixel $F_{out}$ is v which indicates the shift from the corresponding position B. Then we split the v into $v_0$ (backward MV) and $v_1$ (forward MV):

$$v_1 = \omega \cdot v$$

$$v_0 = v_1 - v$$

Let the position of $F_{out}$ be X. So the position of C and D is:

$$X_C = X + v_1$$

$$X_D = X + v_0$$

The interpolated pixel Pp is constructed by pixel-level mixing as $$MC\_w\_avg = (1-w)*C + w*D,$$

$$Collocated\_w\_avg = (1-w)*A + w*B,$$

$$Pp = (1-mp)*MC\_w\_avg + mp*collocated\_w\_avg,$$

where mp is the pixel level mixing factor calculated for each pixel.

The pixel level mixing factor tends to reflect the reliability of the winner motion vector. If the winner motion vector is not reliable, we will scale down pixel level mixing factor mp to reduce the weight from the pixels pointed by the winner motion vector and increase the weight of collocated pixels, and vice versa. We use SADs and winner motion vector discrepancy with the neighbors to determine mp.

Figure 28:
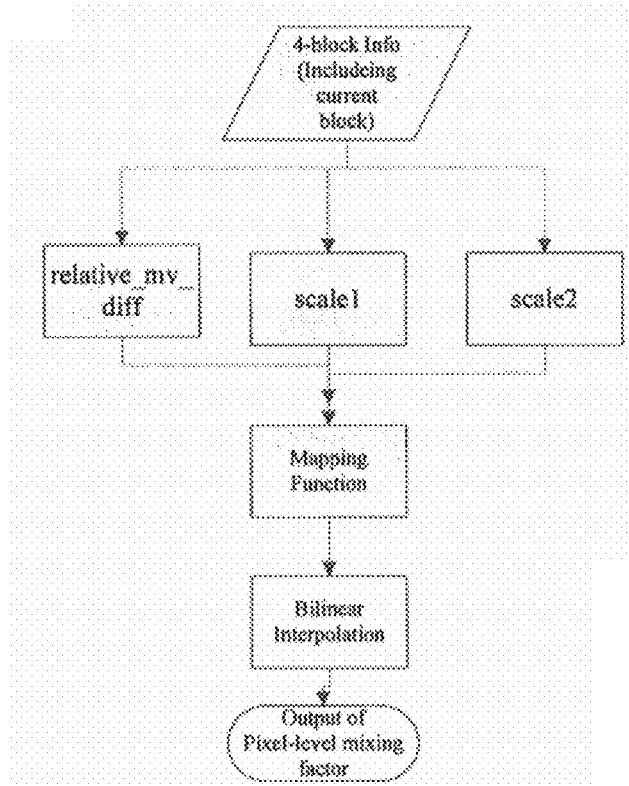
FIG. 28 shows pixel level mixing factor.
Figure 29:
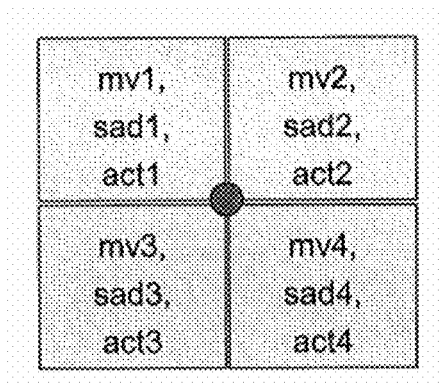
FIG. 29 shows 2×2 blocks considered for block-level mixing factor.

An example of the pixel level mixing factor is described by FIG. 28. First, we want to determine the four block level mixing factors on four corners for the current block. For each corner, block level mixing factor is calculated from its four adjacent blocks as shown in FIG. 29. To determine block level mixing factor, we have to calculate relativeMV_diff, scale1 and scale2 as follows.

```
sum_vec = total vector length of 2x2 blocks in Fig.29.
avg_vec_len = sum_vec/4;
mv_diff = |mv1-mv2| + |mv2-mv3| + |mv3-mv4| + |mv4-mv1|
relativeMV_diff = mv_diff/avg_vec_len
```

The larger the relativeMV_diff is, the less reliable the motion vector is because there is large discrepancy among neighboring motion vectors. Then relativeMV_diff is further scaled by two steps based on average vector length and SAD.

The first scale scale1 is based on different levels of avg_vec_len:

```
if (avg_vec_len < th1)
    scale1 = s1;
else if (average_vec_len < th2)
    scale1 = s2;
else
    scale1 = s3
```

The second scale scale2 considers the block SAD. The more reliable the ME result is; the smaller the SAD should be.

Let sadi, i=1,2,3,4 and acti, i=1,2,3,4 denote SAD and activity for 2x2 blocks (see FIG. 29). Then

```
sum_sad = sad1 + sad2 + sad3 + sad4
sum_act = act1 + act2 + act3 + act4
reliability = coef * sum_sad/sum_act;
if (sum_sad < sum_act || sum_sad < sad_th) {
    scale2=S1
    if (sum_sad < (sum_act/2))
        scale2=S2
}
else if (reliability <= th)
    scale2 = reliability/S4;
else
    scale2=S3
``` where s1~s2, S1~S4, coef are all programmable numbers; th1, th2, sad th and th are thresholds chosen based on experiment results.

Figure 30:
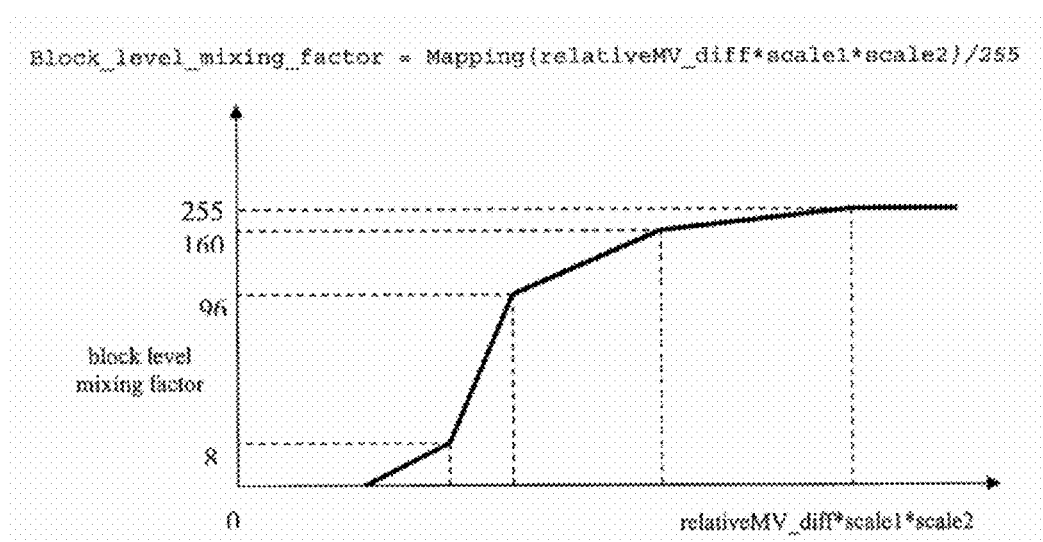
FIG. 30 shows block level mixing factor mapping function.

Finally, we can derive block level mixing factor from relativeMV_diff*scale1*scale2. One example is shown in FIG. 30.

Figure 31:
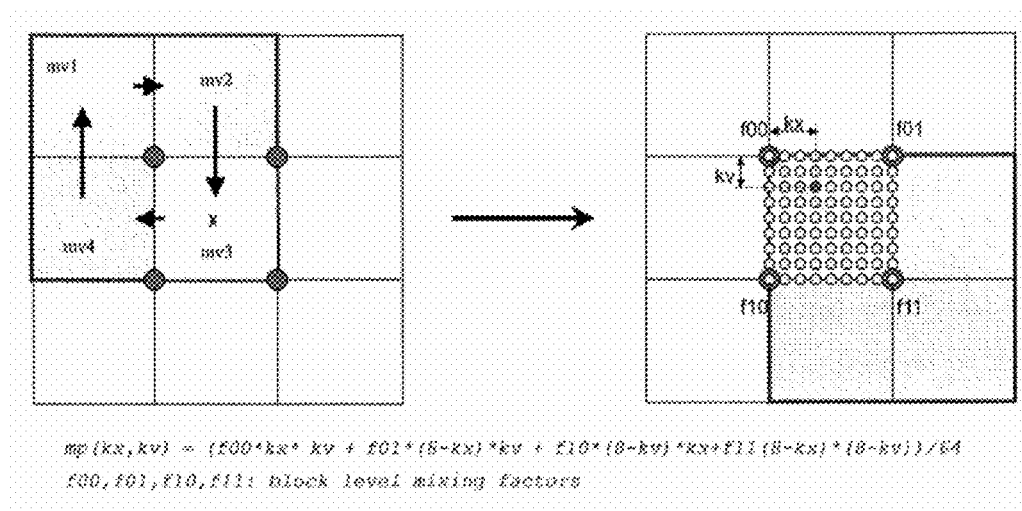
FIG. 31 shows pixel-level mixing factor interpolated from block-level mixing factors.

Once four block level mixing factors are found, bilinear interpolation is applied to find pixel level mixing factor for each pixel inside the current block as shown in FIG. 31.

In certain cases, we cannot use both pixels of the target and reference frames to generate the output pixels or an artifact may appear. We can only use pixels from one side, i.e. single directional MC. We discuss a few of such cases here. There should be more cases that can benefit from single directional MC.

The first case is that one of the two motion vector points out of the picture boundary. This may occurs for the blocks close to the picture boundary. We only use the pixels from the other motion vector to do MC.

It is possible that a non-logo block may have a motion vector pointing to a logo block similar to the scenario shown in FIG. 23. When it occurs, the artifact looks like that the logo is jumping out of its original position. When we found a non-logo block uses a motion vector pointing to a logo block, we will not use that motion vector. Instead we only use pixels from the other direction to do MC.

Figure 32:
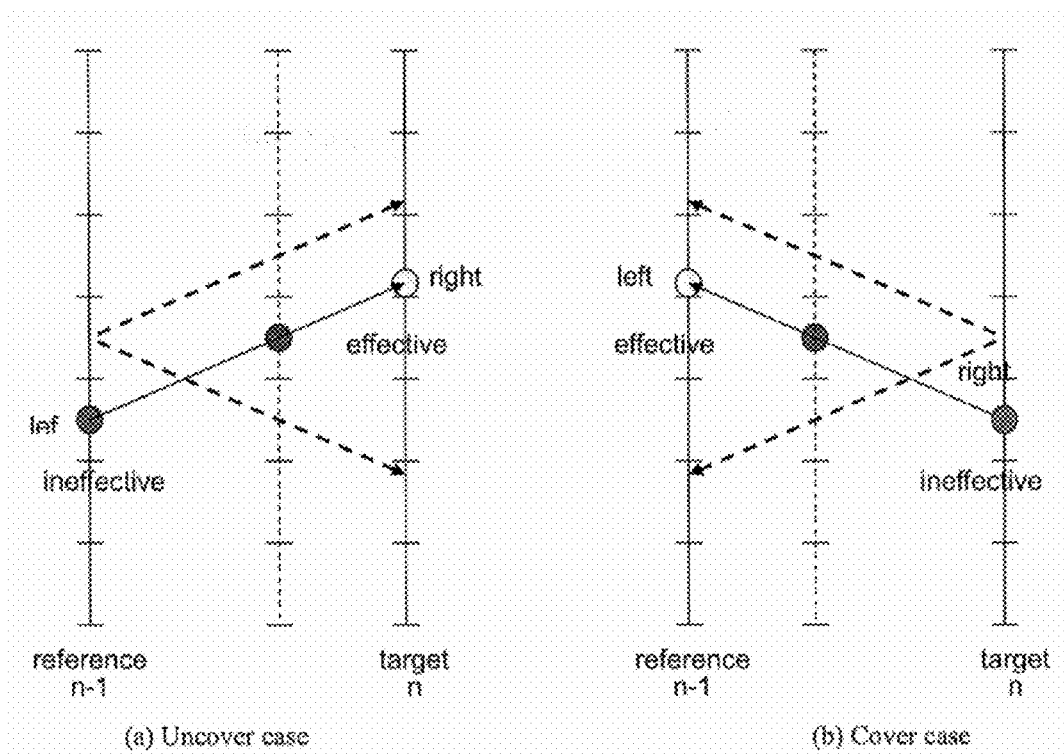
FIG. 32 shows MC for cover/uncover area.

When occlusion (covering/uncovering) occurs, only one of those two frames has the correct pixels that we can use to do MC. As shown in FIG. 32, the dark point in the middle denotes the current pixel to be interpolated, the dark one on the side denotes effective fetching and the light one denotes ineffective fetching from target frame (n) or reference frame (n−1). FIG. 32 (a) is an uncover case, which means the objects will appear suddenly in the next or future frame. We will use forward MV to do the MC for those UNCOVER blocks. FIG. 32 (b) is a cover case, which means the objects will disappear suddenly in the next or future frame. We will use backward MV to do the MC for those COVER blocks. We have to use single directional MC because the object can be only found in one direction but not the other.

Blockness artifacts may appear when two adjacent blocks use two different MC schemes, that is, one uses bi-directional MC and the other uses single-directional MC. The inconsistency could cause discontinuity on the block boundaries. We propose an filter to remove such artifact according cover detection information.

For normal blocks, the motion compensation is performed as described in earlier sections. If v is the motion vector for the pixel f, then we calculate forward motion vector $v_1 = w*v$ and backward motion vector $v_0 = v - v_1$. The interpolated pixel output is $(1-w)*C + w*D$, where C is the pixel value pointed by $v_1$ in the reference frame and D is the pixel pointed by $v_0$ in the target frame as shown in FIG. 27.

Figure 33:
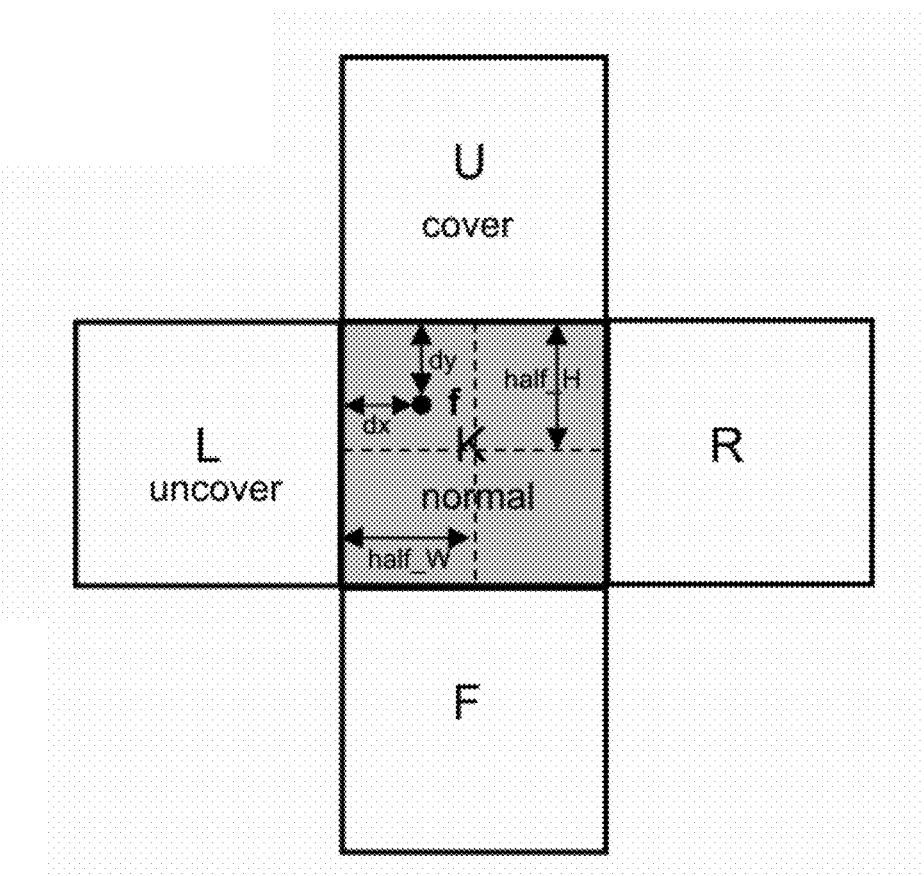
FIG. 33 shows an filter according to one embodiment of the invention.

As shown in FIG. 33, for each normal block K, check its four neighboring blocks U, L, F and R. If any of them is cover/uncover block, we would substitute one of the two pixels used for MC. Assume U is a cover block, and L is an uncover block. Pixels in the upper half of block K will replace pixel D by dy/half_H*D+(half_H−dy)/half_H*P(reference frame)($mv_{A,fwd}$).

And pixels in the left half of block K will replace C by dx/half_W*C+(half_W−dx)/half_W*P(target frame) ($mv_{B,fwd}$), where $mv_A$, $mv_B$, are the motion vectors for blocks U and L, respectively. P(fr)(mv) is the pixel pointed by mv to the frame fr.

If F and R are cover/uncover blocks, repeat the above steps to the right half (closest to R) and bottom half (closest to R) pixels of block K. With the introduction of the new pixels in the blending equation, the blockness artifact can be significantly reduced.

Using MEMC for frame rate conversion is a very challenging task. The quality would depend on the video complexity. Some are easy to do such as a smooth panning video. Some are very difficult to do such as complicated scenes with a lot of occlusions or quick irregular motions. The artifact may appear when MEMC does not perform properly. When there are too many artifacts, the quality of the video becomes unbearable. We would either turn off the MEMC or reduce the strength of MEMC to avoid or reduce the artifact.

To determine when to turn off MEMC, we identify scenarios that MEMC cannot perform well, such as scene change or fade in/out. We also collect statistics that could give us hints that ME does not perform well. Two key frame level statistics are collected:

frame_mv_reliability=Σ|current frame block MV−previous frame block MV|/Σ|current frame block MV|frame_sad_reliability=Σblock_SAD/block_ACT Frame_mv_reliability measures how motion vectors differ between two frames at the collocated position, and frame_sad_reliability measures how well ME can find matching blocks for the current frame.

Then a group of conditions are checked such as:
   (a) Frame unreliability condition: when both frame_mv_reliability and frame_sad_reliability are large.
   (b) Fast motion condition: too many blocks have large motion vectors and frame_sad_reliability is also large.
   (c) Fade-in/out condition: the current frame is during fade-in/out sequence.
   (d) Scene change condition: the current frame is a scene change.
   (e) Global motion condition 1: no global regional motion for many consecutive frames and frame_sad_reliability is large.
   (f) Global motion condition 2: global region motion is detected for consecutive frames, but they are very different frame by frame.
   (g) Cover/uncover condition: too many cover/uncover blocks detected in a frame.
   (h) Unreliable condition: too many unreliable blocks (SAD>>activity).

Thresholds for these conditions are defined based on both objective and subjective measure for visual quality. Based on the conditions, we would determine whether we should enable MEMC or not.

When MEMC is off, we either repeat the original frames (X,Y) or output the average of two frames:

output=X or Y or (X+Y)/2.

There won't be any artifact but the motion judder is the worst. We can turn on MEMC to its full strength. The output would be interpolated pixels for every interpolated frame position:

output=Pp.

The video would be most smooth but the artifact would be most visible if there is any.

However, we found only two levels of MEMC, i.e. on and off, are not enough. We need more MEMC levels so that we can provide more choices of trade-off between judder and video quality. In addition, when transiting from MC on to MC off or vice versa, the video appears unnatural due to sudden change in the frame rate. We need intermediate levels for smoother transition. The intermediate MEMC levels can be created by blending the interpolated frames and the original frames with different weights:

output=w1*X+w2*Y+(1−w1−w2)*Pp.

Note that the weights vary for different interpolated frame positions between two original frames. For example, for 24 Hz->120 Hz case, we need to insert 4 interpolated frames between 2 original frames. The sequence would be like : {X, a, b, c, d, Y} for completely MC on, where X and Y are the original frames and a, b, and c are MC frames. For intermediate MEMC levels, we can output {X, (X+b)/2, b, c, (Y+c)/2, Y} instead.

To move from level to level, certain conditions need to be met by comparing all or some of the above statistics to predefined thresholds. Each level needs to stay for a certain number of frames before moving to next level. This would ensure smooth transition for MEMC.

Figure 7:
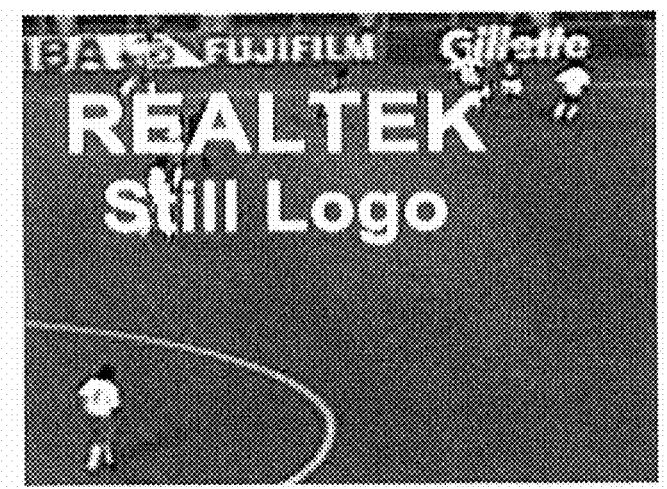
FIG. 7 shows a logo example.

When logo is presented in the video, it increases the difficulty for MEMC. For example, when a still logo is overlaid on a moving object or background, some of the pixels are not moving (logo) and some of the pixels in the same block are moving (object). It is difficult for ME to find the true motion vector for every pixel in that block. The motion vector may either follow the logo (still) or follow the background (non-still). If motion compensation is not done properly, logo artifact will appear. We may see the logo is broken or logo appears on the place where it is not supposed to be. The purpose of the logo detection method is to differentiate logo pixels from non-logo pixels. When output pixels are generated, static blending is done for logo pixels, and motion compensation is done for non-logo pixels. An example of logo is shown in FIG. 7.

Logo area has the following characteristics:
  1. The edges of logos are sharp and clear.
  2. The luminance and/or chrominance of a logo are usually different from the video.
  3. The logo would stay at the same location over a period of time.

Therefore, logo detection unit 112 in frame feature extraction module 110 is for detecting a block logo or for generating logo detection information from the input frames according to the above characteristics.

We use the above characteristics to detect the logo. Like in ME, the picture is partitioned into small fixed blocks. The block size is not necessary the same size as ME. For each block, we go through each pixel in the block and check if the pixel has the above characteristics. If most of the pixels in the block have the logo characteristics, we mark the block as a potential logo block candidate. Since logo stays on the picture for a long period of time, we have a counter to keep track how long the block has been marked as a logo block. We then use the value of the counter to decide if the block should be treated as a logo block for the current time frame. After this step, considering logo area should be a contiguous area, we would like to remove some isolated logo blocks and fill some holes in the logo areas.

All the pixels in the logo block are marked as logo pixels. In the MC stage, non-logo pixels will perform regular MC. For logo pixels, we will take regular MC result and pixel values at co-located positions in the current and previous frames to generate final output pixel value.

Next, we describes our invention how to detect logo blocks.

Here we use 8×8 block size as an example. Logo_candidate is a marker to indicate how certain the block has logo in it. (x,y) is the index of a pixel in the block from the upper-left corner position. T is the pixels in frame (t), and R is the pixels in frame (t−1). We calculate SAD between two blocks in frame (t) and frame (t−1) at the same location as the following equation. For logo area, most of the pixels are not moving so SAD should be very small.

$$SAD = \sum_{j=0}^{7}\sum_{i=0}^{7} |T_{x+i,y+j} - R_{x+i,y+j}|$$

Num_still is the number of still pixels in the 8×8 block; num_not_still is number of non-still pixels in the 8×8 block. We calculate num_still and num_not_still using the following equations.

$$diff_{i,j} = |T_{x+i,y+j} - R_{x+i,y+j}|$$
$$still_{i,j} = (diff_{x+i,y+j} < \text{logo\_threshold1}) ? 1 : 0$$
$$\text{num\_still} = \sum_{j=0}^{7}\sum_{i=0}^{7} still_{i,j}$$
$$not\_still_{i,j} = (diff_{x+i,y+j} > \text{logo\_threshold2}) ? 1 : 0$$
$$\text{num\_not\_still} = \sum_{j=0}^{7}\sum_{i=0}^{7} not\_still_{i,j}$$

Next we collect pixel based edge information (edgeH and edgeV). For each pixel in an 8×8 block (pixel[1][1] in FIG. 8), we look at its surrounding 3×3 pixel window for both target and reference frames and we calculate the adjacent horizontal and vertical pixel differences. Note: the difference is directional, that is, rdiffh1, rdiffh2, etc are signed integers.

Then we check if there is edge existed at vertical 1,2,3, or vertical 4,5,6. Using vertical 4,5,6 in FIG. 8 as an example, if there is a logo on the first and second columns in the 3×3 window, and background on third column, then there will be an edge between vertical 4,5,6, and the pixel difference across them will be big for both reference and target frames. Also because column 1 and 2 are logo pixels, their differences will be small for both reference and target frames. In summary, we use the following rules to decide if there is an edge on 4,5,6: (logo_PixSmallDiff and logo_PixBigDiff are adaptive thresholds)

```
edgeV @ 4,5,6 =
    abs(rdiffh1) < logo_PixSmallDiff &&
    abs(rdiffh2) < logo_PixSmallDiff &&
    abs(rdiffh3) < logo_PixSmallDiff &&
    abs(tdiffh1) < logo_PixSmallDiff &&
    abs(tdiffh2) < logo_PixSmallDiff &&
    abs(tdiffh3) < logo_PixSmallDiff &&
    rdiffh4 > logo_PixBigDiff &&
    rdiffh5 > logo_PixBigDiff &&
    rdiffh6 > logo_PixBigDiff &&
    tdiffh4 > logo_PixBigDiff &&
    tdiffh5 > logo_PixBigDiff &&
    tdiffh6 > logo_PixBigDiff
```

In the same way, we check if there are edges existed at vertical 1,2,3, horizontal 1,2,3 and horizontal 4,5,6. Then we determine the edge pixels in the 8×8 block. To qualify as an edge pixel, either edgeH or edgeV needs to be non-zero and pixel value needs to be bigger than a threshold.

We also check if there are any edges (edgeX) existed when the video behind the logo has a global regional motion vector in perpendicular direction. When found, it is a strong indicator that such edge belongs to a logo since it is not moving with the video in the background.

We then count how many edge pixels and edgeX in the 8×8 block. The more edge pixels and edgeX, the more confidence we have that this block is part of the logo area. The logo candidate status (logo_candidate) is determined by considering edge pixels, edgeX, num_still, num_not_still, SAD and motion vectors of surrounding blocks in the current and previous frames (most of them should be zero or very small since some of them are part of the logo area).

Since logo usually stays on the video for a period of time, we will have a counter logo_counter for each block to count how long the block has been staying still. We update the counter using logo_candidate. We compare the value of the logo_counter to a threshold to determine whether the block should be considered as a logo_block.

Figure 9:
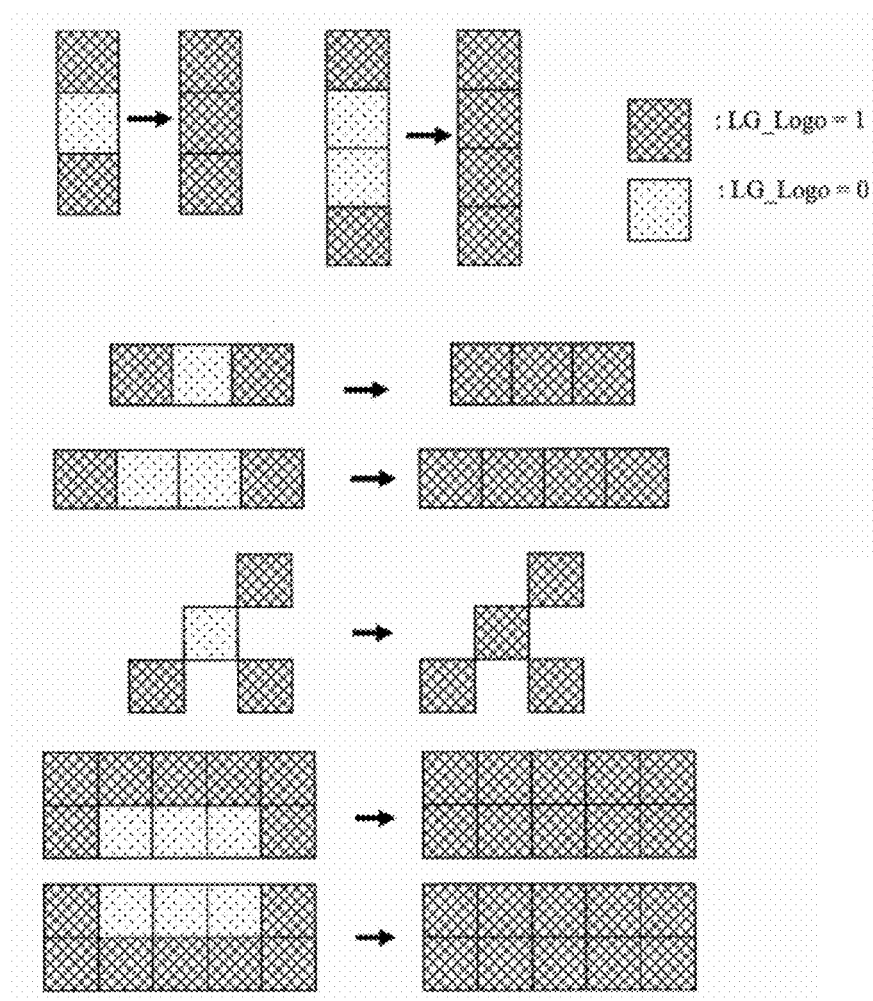
FIG. 9 shows an example of filling the holes of logo.
Figure 10:
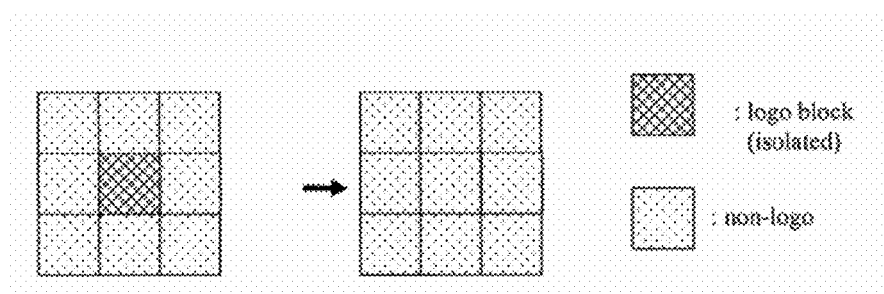
FIG. 10 shows an example of removal of isolated logo.

Next we will remove isolated logo blocks and fill the holes in a logo area. Since logo usually consists of several letters or marks, the logo area usually is a big contiguous area. If there is an isolated logo block, we would consider it is a false detection and change the block to non-logo. On the other hand, if there is a non-logo block surrounding by logo blocks, we would change the block to logo block. Some examples (but not limited to these cases) are shown in FIG. 9 and FIG. 10. The final logo information can then be used in MC stage to generate correct output.

Figure 11:
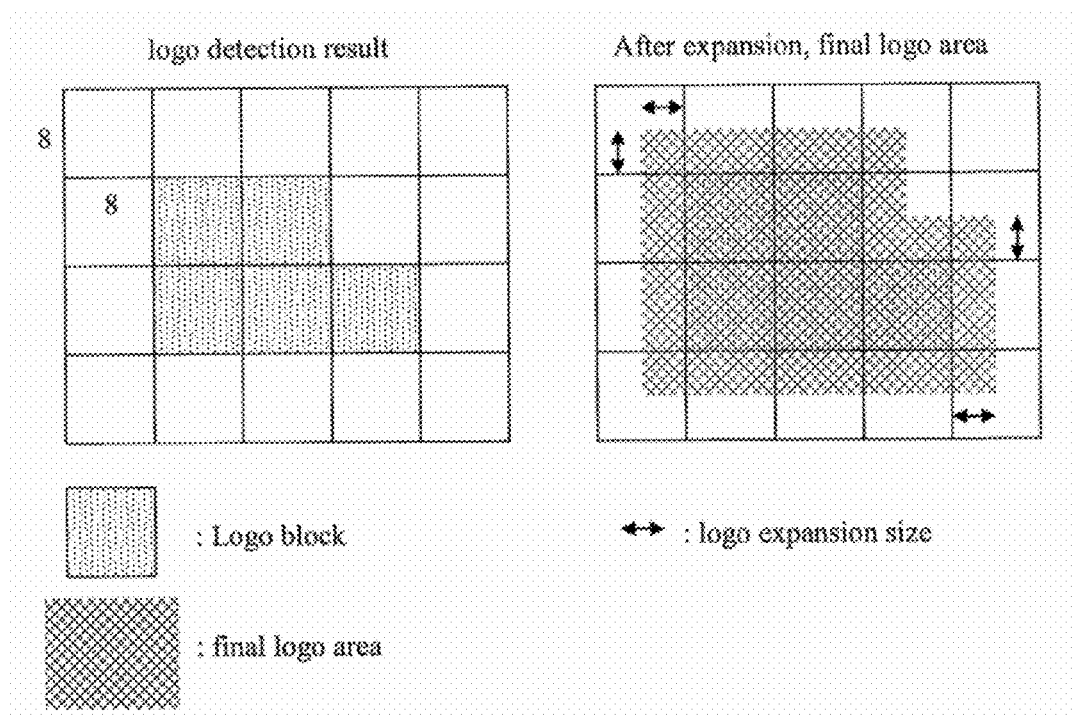
FIG. 11 illustrates logo area expansion.

Logo block is a block with most of its pixels belonging to a logo. Logo detection would mark each block as logo or non-logo block. In addition, pixels adjacent to logo blocks (but not in logo blocks) can also be marked as logo pixels, this is helpful to cover the area like the tip of a character like 'b', 'd' or 'k', where the majority of the letter have been marked as logo blocks but the tip may not be marked. Then we will expand the logo area around the logo block boundary as shown in FIG. 11.

For non-logo pixel, regular MC scheme is applied. For logo pixel, 3-point median filter is applied on Pp (regular MC output), A and B (shown in FIG. 27) to generate the final output pixel.

Figure 34:
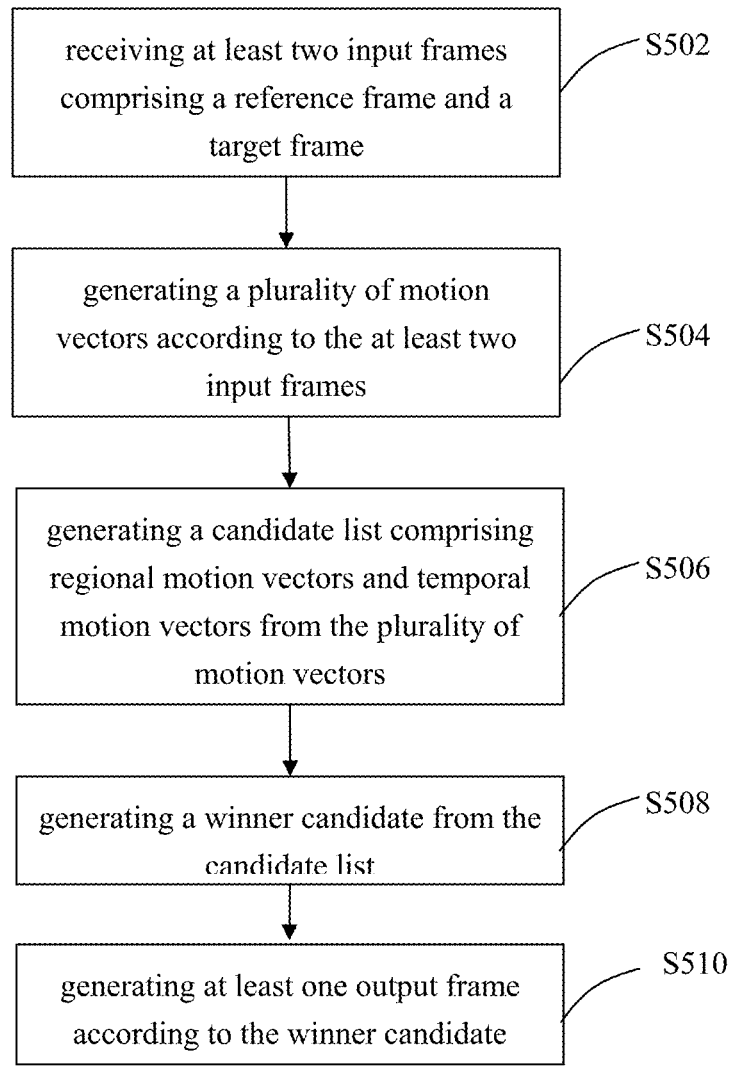
FIG. 34 shows a flowchart illustrating a frame rate conversion method according to one embodiment of the invention.

Next, please refer to FIG. 34, which shows a flowchart illustrating a frame rate conversion method according to one embodiment of the invention. Please note that, if the result is substantially the same, the steps are not required to be executed in the exact order shown in FIG. 34. In addition, the steps in FIG. 34 are not required to be executed sequentially, i.e., other steps can be inserted in between. The steps are detailed as follows:

Step 502: receiving at least two input frames comprising a reference frame and a target frame.

Step 504: generating a plurality of motion vectors according to the at least two input frames.

Step 506: generating a candidate list comprising regional motion vectors and temporal motion vectors from the plurality of motion vectors.

Step 508: generating a winner candidate from the candidate list.

Step 510: generating at least one output frame according to the winner candidate.

According to another embodiment of the invention, Step 506 comprises:

Step 512: generating the candidate list comprising local regional motion vectors.

Step 514: generating the candidate list comprising MvFlow candidates.

According to another embodiment of the invention, Step 508 comprises:

Step 516: choosing a winner motion vector with the smallest SAD as the winner candidate from the candidate list.

According to another embodiment of the invention, Step 508 comprises:

Step 518: choosing a winner motion vector considering its temporal and spatial neighbors' motion vectors as the winner candidate.

According to another embodiment of the invention, Step 508 comprises:

Step 520: choosing a winner motion vector with the total smallest SAD, spatial bias, and temporal bias as winner candidate from the candidate list.

According to another embodiment of the invention, Step 508 comprises:

Step 522: generating a winner candidate from the candidate list by bi-directional search scheme.

According to another embodiment of the invention, the frame rate conversion method further comprises:

Step 524: performing a post ME process to correct the winner motion vector, wherein the post ME process comprises at least one of MV jump correction, cover detection, and outlier filtering.

According to another embodiment of the invention, the frame rate conversion method further comprises:

Step 526: detecting a logo block according to whether a block is moving between the reference frame and the target frame, the time the block has been standing still, or the edge information of the block.

According to another embodiment of the invention, the frame rate conversion method further comprises:

Step 528: performing a frame reliability detection to decide how the winner candidate is weighted to generate the at least one output frame.

According to another embodiment of the invention, the frame rate conversion method further comprises:

Step 530: performing a cover detection by using SAD information according to bi-directional search scheme to detect potential cover and uncover areas in the at least two input frames and generating cover detection information.

According to another embodiment of the invention, the frame rate conversion method further comprises:

Step 532: controlling a interpolated pixel value according to SADs of the winner candidate and its neighboring motion vectors.

According to another embodiment of the invention, the frame rate conversion method further comprises:

Step 534: performing a filtering based on the cover detection information to avoid discontinuity on block boundaries in the at least one output frame.

Those skilled in the art will readily observe that numerous modifications and alterations of the device and method may be made while retaining the teachings of the invention.

What is claimed is:

1. A frame rate conversion method, comprising:
   receiving at least two input frames comprising a reference frame and a target frame;
   generating a plurality of motion vectors according to the at least two input frames;
   generating a candidate list comprising regional motion vectors and temporal motion vectors from the plurality of motion vectors;
   generating a winner candidate from the candidate list; and
   generating at least one output frame according to the winner candidate;
   wherein the step of generating the winner candidate from the candidate list comprises:
   choosing a winner motion vector considering its temporal and spatial neighbors' motion vectors as the winner candidate.

2. The frame rate conversion method of claim 1, wherein the step of generating the candidate list comprising regional motion vectors and temporal motion vectors from the plurality of motion vectors comprises:
   generating the candidate list comprising local regional motion vectors; and
   generating the candidate list comprising MvFlow candidates.

3. The frame rate conversion method of claim 1, wherein the step of generating the winner candidate from the candidate list further comprises:
   choosing the winner motion vector with the smallest SAD as the winner candidate from the candidate list.

4. The frame rate conversion method of claim 1, wherein the step of generating the winner candidate from the candidate list further comprises:
   choosing the winner motion vector with the total smallest SAD, spatial bias, and temporal bias as the winner candidate from the candidate list.

5. The frame rate conversion method of claim 1, wherein the step of generating the winner candidate from the candidate list further comprises:
   generating the winner candidate from the candidate list by bi-directional search scheme.

6. The frame rate conversion method of claim 1, further comprising the following step:
   performing a post ME process to correct the winner motion vector, wherein the post ME process comprises at least one of MV jump correction, cover detection, and outlier filtering.

7. The frame rate conversion method of claim 1, further comprising the following step:
   performing a cover detection by using SAD information according to bi-directional search scheme to detect potential cover and uncover areas in the at least two input frames and generating cover detection information.

8. The frame rate conversion method of claim 7, further comprising the following step:
   performing a filtering based on the cover detection information to avoid discontinuity on block boundaries in the at least one output frame.

9. The frame rate conversion method of claim 1, further comprising the following step:
detecting a logo block according to whether a block is moving between the reference frame and the target frame, the time the block has been standing still, or the edge information of the block.

10. The frame rate conversion method of claim 1, further comprising the following step:
performing a frame reliability detection to decide how the winner candidate is weighted to generate the at least one output frame.

11. The frame rate conversion method of claim 1, wherein the step of generating the at least one output frame according to the winner candidate comprises:
controlling a interpolated pixel value according to SADs of the winner candidate and its neighboring motion vectors.

12. A frame rate conversion apparatus, for receiving at least two input frames to generate at least one output frame, comprising:
a motion estimation module, for generating a candidate list comprising regional motion vectors and temporal motion vectors from the at least two input frames and choosing a winner motion vector from the candidate list; and
a motion compensation module, for generating the at least one output frame according to the winner motion vector;
wherein the winner motion vector is generated according to its temporal and spatial neighbors' motion vectors.

13. The frame rate conversion apparatus of claim 12, wherein the regional motion vectors are local regional motion vectors and the temporal motion vectors are MvFlow candidates.

14. The frame rate conversion apparatus of claim 12, further comprising:
a frame feature extraction module, comprising a fade-in/out detection unit for generating fade-in/out information from the at least two input frames; and
an adaptive MEMC control module, for deciding a weighting of the winner motion vector according to the fade-in/out information;
wherein the at least one output frame is generated according the weighting.

15. The frame rate conversion apparatus of claim 12, further comprising:
a frame feature extraction module, comprising a logo detection unit for generating a logo detection information from the at least two input frames;
wherein the at least one output frame is generated according to the logo information.

16. The frame rate conversion apparatus of claim 12, wherein the winner motion vector is generated according to a bi-directional search scheme.

17. The frame rate conversion apparatus of claim 12, wherein the winner motion vector is with the smallest SAD in the candidate list.

18. The frame rate conversion apparatus of claim 12, wherein the motion estimation module further comprises a post ME unit to perform a post ME process to correct the winner motion vector, and wherein the post ME process comprises at least one of MV jump correction, cover detection, and outlier filtering.

19. A frame rate conversion method, comprising:
receiving at least two input frames comprising a reference frame and a target frame;
generating a plurality of motion vectors according to the at least two input frames;
generating a candidate list comprising regional motion vectors and temporal motion vectors from the plurality of motion vectors;
generating a winner candidate from the candidate list; and
generating at least one output frame according to the winner candidate;
wherein the step of generating the candidate list comprising regional motion vectors and temporal motion vectors from the plurality of motion vectors comprises:
generating the candidate list comprising local regional motion vectors; and
generating the candidate list comprising MvFlow candidatese.

20. A frame rate conversion method, comprising:
receiving at least two input frames comprising a reference frame and a target frame;
generating a plurality of motion vectors according to the at least two input frames;
generating a candidate list comprising regional motion vectors and temporal motion vectors from the plurality of motion vectors;
generating a winner candidate from the candidate list; and
generating at least one output frame according to the winner candidate;
wherein the step of generating the winner candidate from the candidate list comprises:
choosing a winner motion vector with the total smallest SAD, spatial bias, and temporal bias as the winner candidate from the candidate list.

21. A frame rate conversion method, comprising:
receiving at least two input frames comprising a reference frame and a target frame;
performing a cover detection by using SAD information according to bi-directional search scheme to detect potential cover and uncover areas in the at least two input frames and generating cover detection information;
generating a plurality of motion vectors according to the at least two input frames;
generating a candidate list comprising regional motion vectors and temporal motion vectors from the plurality of motion vectors;
generating a winner candidate from the candidate list; and
generating at least one output frame according to the winner candidate.

22. The frame rate conversion method of claim 21, further comprising the following step:
performing a filtering based on the cover detection information to avoid discontinuity on block boundaries in the at least one output frame.

23. A frame rate conversion method, comprising:
receiving at least two input frames comprising a reference frame and a target frame;
generating a plurality of motion vectors according to the at least two input frames;
generating a candidate list comprising regional motion vectors and temporal motion vectors from the plurality of motion vectors;
generating a winner candidate from the candidate list;
generating at least one output frame according to the winner candidate; and
detecting a logo block according to whether a block is moving between the reference frame and the target frame, the time the block has been standing still, or the edge information of the block.

24. A frame rate conversion method, comprising:
receiving at least two input frames comprising a reference frame and a target frame;

generating a plurality of motion vectors according to the at least two input frames;
generating a candidate list comprising regional motion vectors and temporal motion vectors from the plurality of motion vectors;
generating a winner candidate from the candidate list;
generating at least one output frame according to the winner candidate; and
wherein the step of generating the at least one output frame according to the winner candidate comprises:
controlling a interpolated pixel value according to SADs of the winner candidate and its neighboring motion vectors.

* * * * *